(12) United States Patent
Furem et al.

(10) Patent No.: US 8,275,576 B2
(45) Date of Patent: *Sep. 25, 2012

(54) SYSTEM AND METHOD FOR DISTRIBUTED REPORTING OF MACHINE PERFORMANCE

(75) Inventors: Ken Furem, Cumming, GA (US);
Daniel W. Robertson, Cumming, GA (US); Gopal Madhavarao, Alpharetta, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 439 days.

This patent is subject to a terminal disclaimer.

(21) Appl. No.: 12/101,274

(22) Filed: Apr. 11, 2008

(65) Prior Publication Data

US 2008/0201108 A1 Aug. 21, 2008

Related U.S. Application Data

(63) Continuation of application No. 10/920,104, filed on Aug. 17, 2004, now Pat. No. 7,406,399.

(60) Provisional application No. 60/497,782, filed on Aug. 26, 2003.

(51) Int. Cl.
*G06F 11/30* (2006.01)
*G06F 7/70* (2006.01)
*E02D 17/06* (2006.01)

(52) U.S. Cl. ............................. 702/182; 701/50; 37/379

(58) Field of Classification Search .................. 702/182, 702/33, 41, 44, 57, 64, 81, 84, 127, 130–131, 702/141–142, 188; 37/196, 379; 700/108–110; 701/2, 50; 705/8; 340/539.16–539.18, 870.01–870.03, 870.11, 870.16, 870.18–870.19

See application file for complete search history.

(56) References Cited

U.S. PATENT DOCUMENTS

| 2,003,688 A | 6/1935 | Hathaway |
| 5,327,347 A | 7/1994 | Hagenbuch |
| 5,461,803 A | 10/1995 | Rocke |
| 5,629,870 A | 5/1997 | Farag |
| 5,646,844 A | 7/1997 | Gudat |
| 5,648,898 A | 7/1997 | Moore-McKee |
| 5,650,930 A | 7/1997 | Hagenbuch |
| 5,822,224 A * | 10/1998 | Nakanishi et al. ............ 702/174 |
| 5,823,295 A | 10/1998 | Griffith |
| 5,844,800 A | 12/1998 | Brandt |
| 5,850,341 A * | 12/1998 | Fournier et al. ................. 701/50 |
| 5,995,888 A | 11/1999 | Hagenbuch |
| 6,025,686 A * | 2/2000 | Wickert et al. ........... 318/568.18 |

(Continued)

FOREIGN PATENT DOCUMENTS

CA 2227664 7/1998

(Continued)

OTHER PUBLICATIONS

Brown, "Increased Productivity with AC Drives for Mining Excavators and Haul Trucks", Jan. 1, 2000, 10 pages, IEEE, US.

(Continued)

*Primary Examiner* — Toan M Le

(57) ABSTRACT

Certain exemplary embodiments can include obtaining and analyzing data from at least one discrete machine, automatically determining relationships related to the data, taking corrective action to improve machine operation and/or maintenance, automatically and heuristically predicting a failure associated with the machine and/or recommending preventative maintenance in advance of the failure, and/or automating and analyzing mining shovels, etc.

27 Claims, 30 Drawing Sheets

U.S. PATENT DOCUMENTS

| | | | |
|---|---|---|---|
| 6,037,901 A | 3/2000 | Devier | |
| 6,072,127 A * | 6/2000 | Oslakovic | 177/136 |
| 6,112,143 A | 8/2000 | Allen | |
| 6,140,787 A | 10/2000 | Lokhorst | |
| 6,349,252 B1 | 2/2002 | Imanishi | |
| 6,434,512 B1 | 8/2002 | Discenzo | |
| 6,527,130 B2 * | 3/2003 | Ruddy | 212/278 |
| 6,542,851 B2 | 4/2003 | Hasegawa | |
| 6,728,619 B2 | 4/2004 | Adachi | |
| 6,738,697 B2 | 5/2004 | Breed | |
| 6,856,879 B2 | 2/2005 | Arakawa | |
| 6,952,680 B1 | 10/2005 | Melby | |
| 7,079,982 B2 | 7/2006 | Ogura | |
| 7,181,370 B2 | 2/2007 | Furem | |
| 7,287,188 B2 | 10/2007 | Shibata | |
| 7,406,399 B2 * | 7/2008 | Furem et al. | 702/182 |
| 2002/0059320 A1 | 5/2002 | Tamaru | |
| 2003/0115019 A1 | 6/2003 | Doddek | |
| 2003/0120472 A1 | 6/2003 | Lind | |
| 2005/0071064 A1 | 3/2005 | Nakamura | |
| 2006/0212203 A1 | 9/2006 | Furuno | |

FOREIGN PATENT DOCUMENTS

| | | |
|---|---|---|
| CA | 2420046 | 2/2002 |
| CA | 2359887 | 4/2002 |

OTHER PUBLICATIONS

Ramsaran, "Development of a Mobile Equipment Management System", Oct. 1, 2000, UCGE Reports No. 20146, The University of Calgary, A Thesis of Master Degree, Department of Geomagnetics Engineering, Canada.

* cited by examiner

FIG. 5A

| TELEGRAM LAYOUT FLEET CLIENT/SERVER | | SCANNED DATA | |
|---|---|---|---|
| ENTRY | DESCRIPTION | SCALING | UNITS | PANEL |
| 1 | TYPE OF MACHINE | | TEXT | TITLE |
| 2 | MACHINE IDENTIFIER | | TEXT | TITLE |
| 3 | DIPPER LOAD | 0-150 | TONS | PRODUCTION |
| 4 | CURRENT TRUCK LOAD | 0-500 | TONS | PRODUCTION |
| 5 | LAST TRUCK LOAD | 0-500 | TONS | PRODUCTION |
| 6 | SHIFT TONS | 0-2000x100 | TONS | PRODUCTION |
| 7 | LINE VOLTAGE | -18000 TO +18000 | VAC | GEN DIG |
| 8 | N/A | | | GEN DIG |
| 9 | POWER FACTOR | -100 TO +100 | % | GEN DIG |
| 10 | MACHINE KW | -5000 TO +5000 | kW | GEN DIG |
| 11 | TRANSFORMER #1 TEMP | 0-250 | DEG C | GEN DIG |
| 12 | TRANSFORMER #2 TEMP | 0-250 | DEG C | GEN DIG |
| 13 | HOIST SPEED | -2500 TO +2500 | RPM | HST |
| 14 | HOIST TORQUE | -200 TO +200 | % | HST |
| 15 | HOIST Iw | -2500 TO +2500 | AMPS | HST |
| 16 | HOIST KW | -3248 TO +3248 | kW | HST |
| 17 | HOIST MS | -27648 TO +27648 | RPM | HST |
| 18 | HOIST MOT TEMP | -150 TO 150 | DEG C | HST |
| 19 | CROWD EXTENSION | 0-80 | FT | HST |
| 20 | HOIST ROPE LENGTH | 0-160 | FT | HST |
| 21 | SWING ANGLE | 0 TO 360 | DEG | HST |
| 22 | IGBT MODULE 1 TEMP | -150 TO 150 | DEG C | HST |
| 23 | IGBT MODULE 2 TEMP | -150 TO 150 | DEG C | HST |
| 24 | IGBT MODULE 3 TEMP | -150 TO 150 | DEG C | HST |
| 25 | IGBT MODULE 4 TEMP | -150 TO 150 | DEG C | HST |
| 26 | IGBT MODULE 5 TEMP | -150 TO 150 | DEG C | HST |
| 27 | IGBT MODULE 6 TEMP | -150 TO 150 | DEG C | HST |
| 28 | IGBT MODULE 7 TEMP | -150 TO 150 | DEG C | HST |
| 29 | HOIST DRUM R BEAR TEMP | -210 TO +1200 | DEG C | HST |
| 30 | HOIST DRUM L BEAR TEMP | -210 TO +1200 | DEG C | HST |
| 31 | HOIST UP IN PINION BEAR TEMP | -210 TO +1200 | DEG C | HST |
| 32 | HOIST LOW IN PINION BEAR TEMP | -210 TO +1200 | DEG C | HST |
| 33 | HOIST MTR R BEAR TEMP | -210 TO +1200 | DEG C | HST |
| 34 | HOIST MTR L BEAR TEMP | -210 TO +1200 | DEG C | HST |
| 35 | HOIST GEARCASE OIL TEMP | -210 TO +1200 | DEG C | HST |
| 36 | HOIST GEARCASE OIL PRESSURE TRANSMITTER | 0-100 | PSI | HST |
| 37 | CROWD SPEED | -2500 TO +2500 | RPM | CRD |
| 38 | CROWD TORQUE | -200 TO +200 | % | CRD |
| 39 | CROWD Iw | -2500 TO +2500 | AMPS | CRD |
| 40 | CROWD KW | -650 TO +650 | kW | CRD |
| 41 | CROWD MS | -27648 TO +27648 | RPM | CRD |
| 42 | CROWD MOTOR TEMPERATURE | -150 TO 150 | DEG C | CRD |
| 43 | IGBT MODULE 8 TEMP | -150 TO 150 | DEG C | HST |
| 44 | IGBT MODULE 9 TEMP | -150 TO 150 | DEG C | HST |
| 45 | IGBT MODULE 10 TEMP | -150 TO 150 | DEG C | HST |
| 46 | IGBT MODULE 11 TEMP | -150 TO 150 | DEG C | HST |
| 47 | IGBT MODULE 12 TEMP | -150 TO 150 | DEG C | HST |

FIG. 5B

| | | | | |
|---|---|---|---|---|
| 48 | IGBT MODULE 13 TEMP | -150 TO 150 | DEG C | HST |
| 49 | IGBT MODULE 14 TEMP | -150 TO 150 | DEG C | HST |
| 50 | N/A | | | CRD |
| 51 | CROWD DRUM R BEAR TEMP | -210 TO +1200 | DEG C | CRD |
| 52 | CROWD DRUM L BEAR TEMP | -210 TO +1200 | DEG C | CRD |
| 53 | CROWD IN SHAFT IN BEAR TEMP | -210 TO +1200 | DEG C | CRD |
| 54 | CROWD IN SHAFT OUT BEAR TEMP | -210 TO +1200 | DEG C | CRD |
| 55 | CROWD 1 INTER SHAFT IN BEAR TEMP | -210 TO +1200 | DEG C | CRD |
| 56 | CROWD 1 INTER SHAFT OUT BEAR TEMP | -210 TO +1200 | DEG C | CRD |
| 57 | CROWD 2 INTER SHAFT IN BEAR TEMP | -210 TO +1200 | DEG C | CRD |
| 58 | CROWD 2 INTER SHAFT OUT BEAR TEMP | -210 TO +1200 | DEG C | CRD |
| 59 | CROWD MOT R BEAR TEMP | -210 TO +1200 | DEG C | CRD |
| 60 | CROWD MOT L BEAR TEMP | -210 TO +1200 | DEG C | CRD |
| 61 | SWING SPEED | -2500 TO +2500 | RPM | SWG |
| 62 | SWING TORQUE | -200 TO +200 | % | SWG |
| 63 | SWING Iw | -2500 TO +2500 | AMPS | SWG |
| 64 | SWING KW | -1290 TO +1290 | KW | SWG |
| 65 | SWING MS | -27648 TO +27648 | nm | SWG |
| 66 | SWING #1 MOTOR TEMPERATURE | -150 TO 150 | DEG C | SWG |
| 67 | SWING #2 MOTOR TEMPERATURE | -150 TO 150 | DEG C | SWG |
| 68 | SWING #1 VIBRATION #1 | | DEG C | SWG |
| 69 | SWING #1 VIBRATION #2 | | DEG C | SWG |
| 70 | SWING #1 VIBRATION #3 | | DEG C | SWG |
| 71 | SWING #1 VIBRATION #4 | | DEG C | SWG |
| 72 | SWING #1 VIBRATION #5 | | DEG C | SWG |
| 73 | SWING #1 VIBRATION #6 | | DEG C | SWG |
| 74 | SWING #1 VIBRATION #7 | | DEG C | SWG |
| 75 | SWING #1 VIBRATION #8 | | DEG C | SWG |
| 76 | SWING #1 VIBRATION #9 | | DEG C | SWG |
| 77 | SWING #1 VIBRATION #10 | | DEG C | SWG |
| 78 | SWING GEARCASE 1 UP FORE BEARING TEMP | -210 TO +1200 | DEG C | SWG |
| 79 | SWING GEARCASE 1 UP AFT BEARING TEMP | -210 TO +1200 | DEG C | SWG |
| 80 | SWING MTR 1 UP BEAR TEMP | -210 TO +1200 | DEG C | SWG |
| 81 | SWING MTR 1 LOW BEAR TEMP | -210 TO +1200 | DEG C | SWG |
| 82 | N/A | | | |
| 83 | N/A | | | |
| 84 | N/A | | | |
| 85 | N/A | | | |
| 86 | SWING #2 VIBRATION #1 | | | |
| 87 | SWING #2 VIBRATION #2 | | | |
| 88 | SWING #2 VIBRATION #3 | | | |
| 89 | AIR PRESSURE | DIRECT READ IN PSIg | | SWG |
| 90 | LUBE SYS A1 PRESSURE | DIRECT READ IN PSIg | | SWG |
| 91 | LUBE SYS A2 PRESSURE | DIRECT READ IN PSIg | | SWG |
| 92 | LUBE SYS B1 PRESSURE | DIRECT READ IN PSIg | | SWG |

FIG. 5C

| 93 | LUBE SYS B2 PRESSURE | DIRECT READ IN PSI | G | SWG |
|---|---|---|---|---|
| 94 | LUBE SYS C1 PRESSURE | DIRECT READ IN PSI | G | SWG |
| 95 | LUBE SYS C2 PRESSURE | DIRECT READ IN PSI | G | SWG |
| 96 | SWING GEARCASE 2 UP FORE BEARING TEMP | -210 TO +1200 | DEG C | SWG |
| 97 | SWING GEARCASE 2 LOW AFT BEARING TEMP | -210 TO +1200 | DEG C | SWG |
| 98 | SWING MTR 2 UP BEAR TEMP | -210 TO +1200 | DEG C | SWG |
| 99 | SWING MTR 2 LOW BEAR TEMP | -210 TO +1200 | DEG C | SWG |
| 100 | N/A | | | |
| 101 | N/A | | | |
| 102 | N/A | | | |
| 103 | N/A | | | |
| 104 | STATUS BYTE #1 | | BIN DEC | STATUS |
| 105 | STATUS BYTE #2 | | BIN DEC | STATUS |
| 106 | STATUS BYTE #3 | | BIN DEC | STATUS |
| 107 | STATUS BYTE #4 | | BIN DEC | STATUS |
| 108 | STATUS BYTE #5 | | BIN DECODE | |
| 109 | STATUS BYTE #6 | | BIN DECODE | |
| 110 | STATUS BYTE #7 | | BIN DECODE | |
| 111 | STATUS BYTE #8 | | BIN DECODE | |
| 112 | STATUS BYTE #9 | | BIN DECODE | |
| 113 | STATUS BYTE #10 | | BIN DECODE | |
| 114 | MESSAGE | | TEXT | |

SYSTEM AND METHOD FOR DISTRIBUTED REPORTING OF MACHINE PERFORMANCE

CROSS-REFERENCES TO RELATED APPLICATIONS

This application is a continuation of, claims priority to, and incorporates by reference herein in its entirety, U.S. patent application Ser. No. 10/920,104, filed 17 Aug. 2004, now U.S. Pat. No. 7,406,399, which claims priority to U.S. Provisional Patent Application Ser. No. 60/497,782, filed 26 Aug. 2003.

BACKGROUND

Industrial automation has increased in scope and refinement with time. In general, industrial automation has focused on continuous processes comprising a plurality of interacting machines. Heretofore, automation has not fully developed using automation for process improvement relating to production and/or reliability related to discrete machines in certain applications.

United States Patent Application No. 20030120472 (Lind), which is incorporated by reference herein in its entirety, allegedly cites a "process for simulating one or more components for a user is disclosed. The process may include creating an engineering model of a component, receiving selection data for configuring the component from a user, and creating a web-based model of the component based on the selection data and the engineering model. Further, the process may include performing a simulation of the web-based model in a simulation environment and providing, to the user, feedback data reflecting characteristics of the web-based model during the simulation." See Abstract.

United States Patent Application No. 20020059320 (Tamaru), which is incorporated by reference herein in its entirety, allegedly cites a "plurality of work machines is connected by first communication device such that reciprocal communications are possible. One or a plurality of main work machines out of the plurality of work machines are connected to a server by second communication device such that reciprocal communications are possible. Each work machine is provided with work machine information detection device for detecting work machine information. The server is provided with a database which stores data for managing the work machines, and management information production device for producing management information based on the work machine information and on data stored in the database. In conjunction with the progress of work by the plurality of work machines, work machine information is detected by the work machine information detection device provided in the work machines, and that detected work machine information is transmitted to the main work machine via the first communication device. The main work machine transmits the transmitted work machine information to the server via the second communication device. The server produces management information, based on the transmitted work machine information and on data stored in the database, and transmits that management information so produced to the main work machine via the second communication device. The main work machine manages the work machines based on the management information so transmitted." See Abstract.

SUMMARY

Certain exemplary embodiments can comprise obtaining and analyzing data from at least one discrete machine, automatically determining relationships related to the data, taking corrective action to improve machine operation and/or maintenance, automatically and heuristically predicting a failure associated with the machine and/or recommending preventative maintenance in advance of the failure, and/or automating and analyzing mining shovels, etc.

Certain exemplary embodiments comprise a method comprising at a remote server, receiving representative data obtained from a set of sensors associated with a machine, said representative data transmitted responsive to a transmission rate selected by a wirelessly receiving user; and storing said received representative data in a memory device.

Certain exemplary embodiments comprise a method comprising at an information device, receiving representative data from a memory device, said representative data generated by a set of sensors associated with a machine, said representative data transmitted responsive to a transmission rate selected by a wirelessly receiving user; and rendering at least one report responsive to said representative data.

Certain exemplary embodiments comprise receiving a plurality of values for a plurality of machine variables associated with one or more machine components; analyzing at least two variables from the plurality of machine variables, to determine a performance of the one or more machine components; and rendering a report that indicates the determined performance of the machine components

BRIEF DESCRIPTION OF THE DRAWINGS

A wide variety of potential embodiments will be more readily understood through the following detailed description, with reference to the accompanying drawings in which:

FIGS. 5*a*, 5*b*, and 5*c* are an exemplary embodiment of a partial log file layout for data associated with a mining shovel;

DEFINITIONS

Figure 1:
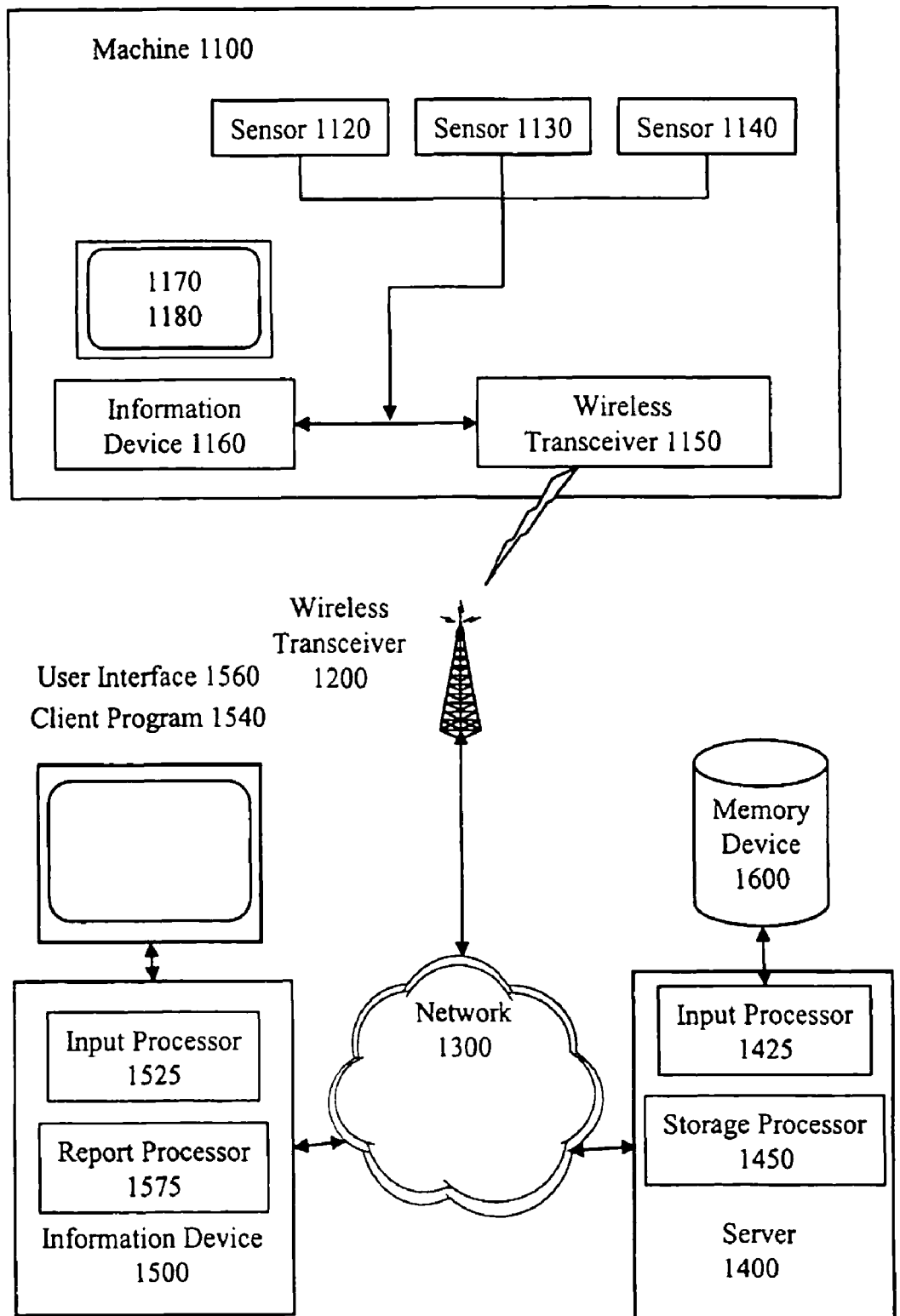
FIG. 1 is a block diagram of an exemplary embodiment of a machine data management system 1000.

When the following terms are used herein, the accompanying definitions apply:

Active X—a set of technologies developed by Microsoft Corp. of Redmond, Wash. Active X technologies are adapted to allow software components to interact with one another in a networked environment, such as the Internet. Active X controls can be automatically downloaded and executed by a Web browser.

activity—performance of a function.

analogous—logically representative of and/or similar to.

analysis—evaluation.

automatic—performed via an information device in a manner essentially independent of influence or control by a user.

communicate—to exchange information.

communicative coupling—linking in a manner that facilitates communications.

component—a part.

condition—existing circumstance.

connection—a physical and/or logical link between two or more points in a system. For example, a wire, an optical fiber, a wireless link, and/or a virtual circuit, etc.

correlating—mathematically determining relationships between two or more non-time variables. For example, correlating can comprise a gamma association calculation, Pearson association calculation, tests of significance, linear regression, multiple linear regression, polynomial regression, non-linear regression, partial correlation, semi-partial correlation multicollinearity, suppression, trend analysis, curvilinear regression, exponential regression, cross-validation, logistic regression, canonical analysis, factor analysis, and/or analysis of variance techniques, etc.

cycle time—a time period associated with loading a haulage machine with an electric mining shovel.

data—numbers, characters, symbols etc., that have no "knowledge level" meaning. Rules for composing data are "syntax" rules. Data handling can be automated.

database—one or more structured sets of persistent data, usually associated with software to update and query the data. A simple database might be a single file containing many records, each of which is structured using the same set of fields. A database can comprise a map wherein various identifiers are organized according to various factors, such as identity, physical location, location on a network, function, etc.

detect—sense or perceive.

determine—ascertain.

deviation—a variation relative to a standard, expected value, and/or expected range of values.

digging—excavating and/or scooping.

dispatch data—information associated with scheduling personnel and/or machinery.

dispatcher—a person, group of personnel, and/or software assigned to schedule personnel and/or machinery. For example, a dispatcher can schedule haulage machines to serve a particular electric mining shovel.

earthen—related to the earth.

electrical—pertaining to electricity.

electrical component—a device and/or system associated with a machine using, switching, and/or transporting electricity. An electrical component can be an electric motor, transformer, starter, silicon controlled rectifier, variable frequency controller, conductive wire, electrical breaker, fuse, switch, electrical receptacle, bus, and/or transmission cable, etc.

electrical performance—performance related to an electrical component of a machine. For example, electrical performance can relate to a power supply, power consumption, current flow, energy consumption, electric motor functionality, speed controller, starter, motor-generator set, and/or electrical wiring, etc.

electric mining shovel—an electrically-powered device adapted to dig, hold, and/or move earthen materials.

electric mining shovel component—a part of an electric mining shovel. A part of an electric mining shovel can be a stick, a mast, a cab, a track, a bucket, a pulley, a hoist, and/or a motor-generator set, etc.

electric mining shovel system—a plurality of components comprising an electric mining shovel. An electric mining shovel system can comprise an electric mining shovel, electric mining shovel operator, dispatch entity, mine in which the electric mining shovel digs, and/or material haulage machine (e.g. a mine haul truck), etc.

electrical—pertaining to electricity.

electrical variable—a sensed reading relating to an electrical component. For example, an electrical power measurement, an electrical voltage measurement, an electrical torque measurement, an electrical motor speed measurement, an electrical rotor current measurement, and/or an electrical transformer temperature measurement, etc.

environmental variable—a variable concerning a situation around a machine. For example, in the case of an electric mining shovel, an environmental variable can be a condition of material under excavation, weather condition, and/or condition of an electrical power supply line, etc.

equipment scheduling information—data associated with a plan for machinery such as locating, operating, storing, and/or maintaining, etc.

expected—anticipated.

export—to send and/or transform data from a first format to a second format.

failed component—a part no longer capable of functioning according to design.

failure—a cessation of proper functioning or performance.

format—an arrangement of data for storage or display.

generate—produce.

graphical—a pictorial and/or charted representation.

heuristic rule—an empirical rule based upon experience, a simplification, and/or an educated guess that reduces and/or limits the search for solutions in domains that can be difficult and/or poorly understood.

hoist—a system comprising motor adapted to at least vertically move a bucket of a mining shovel.

identification—evidence of identity; something that identifies a person or thing.

inactive—idle.

initialization file—a file comprising information identifying a machine and the transmission of sensor data from the machine.

information—data that has been organized to express concepts. It is generally possible to automate certain tasks involving the management, organization, transformation, and/or presentation of information.

information device—any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can include well-known components such as one or more network interfaces, one or more processors, one or more memories containing instructions, and/or one or more input/output (I/O) devices, etc.

Input/Output (I/O) device—the input/output (I/O) device of the information device can be any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

load—an amount of mined earthen material associated with a bucket and/or truck, etc.

load cycle—a time interval beginning when a mine shovel digs earthen material and ending when a bucket of the mining shovel is emptied into a haulage machine.

log file—an organized record of information and/or events.

machine performance variable—a property associated with an activity of a machine. For example, in the case of an electric mining shovel, a machine performance variable can be machine position, tons loaded per bucket, tons loaded per truck, tons loaded per time period, trucks loaded per time period, machine downtime, electrical downtime, and/or mechanical downtime, etc.

Machine Search Language engine—machine readable instructions adapted to query information stored in an organized manner. For example, a machine search language engine can search information stored in a database.

maintenance—an activity relating to restoring and/or preserving performance of a device and/or system.

maintenance activity—an activity relating to restoring and/or preserving performance of a device and/or system.

maintenance entity—a person and/or information device adapted restore and/or preserve performance associated with a device or system.

management entity—a person and/or information device adapted to handle, supervise, control, direct, and/or govern activities associated with a machine.

material—any substance that can be excavated and/or scooped.

maximum acceptable value—a greatest amount in a predetermined range.

measurement—a value of a variable, the value determined by manual and/or automatic observation.

mechanical component—a device and/or system associated with a machine that is not primarily associated with using, switching, and/or transporting electricity. A mechanical component can be a bearing, cable, cable reel, gear, track pad, sprocket, chain, shaft, pump casing, gearbox, lubrication system, drum, brake, wear pad, bucket, bucket tooth, cable, and/or power transmission coupling, etc.

mechanical performance—performance related to a mechanical component or system. For example, mechanical performance can relate to a bearing, gearbox, lubrication system, drum, brake, wear pad, bucket, bucket tooth, cable, power transmission coupling, and/or pump, etc.

mechanical variable—a sensed reading relating to a mechanical component. For example, a bearing temperature measurement, an air pressure measurement, machine load reactions, and/or lubrication system pressure measurements, etc.

memory device—any device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and can store instructions adapted to be executed by the processor according to an embodiment disclosed herein.

metric—a measurement, deviation, and/or calculated value related to a measurement and/or deviation, etc.

Microsoft Access format—information formatted according to a standard associated with the Microsoft Corp. of Redmond, Wash.

Microsoft Excel format—information formatted according to a standard associated with the Microsoft Corp. of Redmond, Wash.

mine—a site from which earthen materials can be extracted.

mine dispatch entity—a person and/or information device adapted to monitor, schedule, and/or control activities and/or personnel associated with an earthen materials extraction operation.

mine dispatcher—an entity performing scheduling and/or monitoring of equipment and/or personnel in an earthen materials extraction operation.

mine dispatch system—a collection of mechanisms, devices, instructions, and/or personnel adapted to schedule and/or monitor equipment and/or personnel in an earthen materials extraction operation.

minimum acceptable value—a smallest amount in a predetermined range.

min/max pointer—a graphical rendering of a low and high operating range of a process variable associated with the electric mining shovel.

motion gauge—a graphical rendering of a gauge associated with an electrical mining shovel.

motion strip chart—a graphical rendering of a stream of process data displayed as a function of time.

motion XY plot—a graphical rendering of a stream of process data displayed as a function of a non-time variable.

non-binary—represented by more than two values. For example, a weight of 45 tons is non-binary; by contrast, a value, such as zero, representing a machine in an off state can be binary if an on state is solely represented by a different single value.

non-digging activities—activities not involving excavating or scooping. For example, in the case of an electric mining shovel, non-digging can comprise bank cleanup, scraping, operator training, and/or repositioning an electrical cable, etc.

non-load—not related to a load or quantity of material.

non-positional—not related to a physical location.

notify—to advise and/or remind.

operational variable—a variable related to operating a machine. For example, an operation variable can be a technique used by an operator to accomplish a task with a first machine (e.g. a path used to lift a load in an electric mining shovel bucket), technique of an operator of a second machine used in conjunction with the first machine (e.g. how a mine haul truck spots relative to the electric mining shovel), practice of scheduling machines and/or personnel by a machine dispatch entity, number of second machines assigned in conjunction with the first machine, characteristics of second machines assigned in conjunction with the first machine (e.g. size, load capacity, dimensions, brand, and/or horsepower, etc.), production time period length, operator rest break length, scheduled production time for the machine, a cycle time, and/or a material weight, etc.

operator—one observing and/or controlling a machine or device.

pan—to move a rendering to follow an object or create a panoramic effect.

panel—a surface containing switches and dials and meters for controlling a device.

part—component.

performance—an assessment. Performance can be measured by a characteristic related to an activity.

position—location relative to a reference point.

predetermined standard—a value and/or range established in advance.

processor—a hardware, firmware, and/or software machine and/or virtual machine comprising a set of machine-readable instructions adaptable to perform a specific task. A processor acts upon information by manipulating, analyzing, modifying, converting, transmitting the information to another processor or an information device, and/or routing the information to an output device.

production data—information indicative of a measure relating to an activity involving operation of a machine. For example, bucket load weight, truck load weight, last truck load weight, total weight during a defined production time period, operator reaction, and/or cycle timer associated with the electric mining shovel, etc.

propelled motion—a linear and/or curvilinear movement of a machine from a first point to a second point.

query—obtain information from a database responsive to a structured request.

real-time—substantially contemporaneous to a current time. For example, a real-time transmission of information can be initiated and/or completed within about 120, 60, 30, 15, 10, 5, and/or 2, etc. seconds of receiving a request for the information.

remote—in a distinctly different location.

rendered—made perceptible to a human. For example data, commands, text, graphics, audio, video, animation, and/or hyperlinks, etc. can be rendered. Rendering can be via any visual and/or audio means, such as via a display, a monitor, electric paper, an ocular implant, a speaker, and/or a cochlear implant, etc.

report—a presentation of information in a predetermined format.

representative data—a plurality of measurement data associated with defined times. For example, representative data can be a plurality of readings from sensor taken over a time period.

reset—a control adapted to clear and/or change a threshold.

save—retain data in a memory device.

schedule—plan for performing work.

schematic model—a logical rendering representative of a device and/or system.

search—a thorough examination or investigation.

search control—one or more sets of machine readable instructions adapted to query a database in a predetermined manner responsive to a user selection.

select—choose.

sensor—a device adapted to measure a property. For example, a sensor can measure pressure, temperature, flow, mass, heat, light, sound, humidity, proximity, position, velocity, vibration, voltage, current, capacitance, resistance, inductance, and/or electromagnetic radiation, etc.

server—an information device and/or software that provides some service for other connected information devices via a network.

shovel motion control variable—a sensed reading relating to motion control in a mining shovel. For example, a hoist rope length, a stick extension, and/or a swing angle, etc.

source—an origin of data. For example, a source can be a sensor, wireless transceiver, memory device, information device, and/or user, etc.

statistical metric—a calculated value related to a plurality of data points. Examples include an average, mean, median, mode, minimum, maximum, integral, local minimum, weighted average, standard deviation, variance, control chart range, statistical analysis of variance parameter, statistical hypothesis testing value, and/or a deviation from a standard value, etc.

status—information relating to a descriptive characteristic of a device and or system. For example, a status can be on, off, and/or in fault, etc.

store—save information on a memory device.

subset—a portion of a plurality.

time period—an interval of time.

transmit—send a signal. A signal can be sent, for example, via a wire or a wireless medium.

transmission rate—a rate associated with a sampling and/or transfer of data, and not a modulation frequency. Units can be, for example, bits per second, symbols per second, and/or samples per second.

user—a person interfacing with an information device.

user interface—any device for rendering information to a user and/or requesting information from the user. A user interface includes at least one of textual, graphical, audio, video, animation, and/or haptic elements.

user selected—stated, provided, and/or determined by a user.

validate—to establish the soundness of, e.g. to determine whether a communications link is operational.

value—an assigned or calculated numerical quantity.

variable—a property capable of assuming any of an associated set of values.

velocity—speed.

visualize—to make visible.

visually-renderable—adapted to be rendered on a visual means such as a display, monitor, paper, and/or electric paper, etc.

wireless—any means to transmit a signal that does not require the use of a wire connecting a transmitter and a receiver, such as radio waves, electromagnetic signals at any frequency, lasers, microwaves, etc., but excluding purely visual signaling, such as semaphore, smoke signals, sign language, etc.

wirelessly receiving user—a user that acquires, directly or indirectly, wirelessly transmitted information.

wireless transmitter—a device adapted to transfer a signal from a source to a destination without the use of wires.

zoom—magnify a rendering.

DETAILED DESCRIPTION

FIG. 1 is a block diagram of an exemplary embodiment of a machine data management system 1000. Machine data management system 1000 can comprise a machine 1100. In certain exemplary embodiments, machine 1100 can be a mining shovel such as an electric mining shovel, blast hole drill, truck, locomotive, automobile, front end loader, bucket wheel excavator, pump, fan, compressor, and/or industrial process machine, etc. Machine 1100 can be powered by one or more diesel engines, gasoline engines, and/or electric motors, etc.

Machine 1100 can comprise a plurality of sensors 1120, 1130, 1140. Any of sensors 1120, 1130, 1140 can measure, for example: time, pressure, temperature, flow, mass, heat, flux, light, sound, humidity, proximity, position, velocity, acceleration, vibration, voltage, current, capacitance, resistance, inductance, and/or electromagnetic radiation, etc., and/or a change of any of those properties with respect to time, position, area, etc. Sensors 1120, 1130, 1140 can provide information at a data rate and/or frequency of, for example, between 0.1 and 500 readings per second, including all subranges and all values therebetween, such as for example, 100, 88, 61, 49, 23, 1, 0.5, and/or 0.1, etc. readings per second. Any of sensors 1120, 1130, 1140 can be communicatively coupled to an information device 1160.

Information obtained from sensors 1120, 1130, 1140 related to machine 1100 can be analyzed while machine 1100 is operating. Information from 1120, 1130, 1140 can relate to performance of at least one of the measurable parts of the electrical system, performance of at least one of the measurable parts of the mechanical system, performance of one or more operators, and/or performance of one or more dispatch entities associated with machine 1100, etc.

The dispatch entity can be associated with a dispatch system. The dispatch system can be an information system associated with the machine. The dispatch system can collect data from many diverse machines and formulate reports of production associated with machine 1100, personnel and/or management entities associated with the production, a location receiving the production, and/or production movement times, etc. Certain exemplary embodiments can collect information related to machine 1100 through operator input codes.

Information device 1160 can comprise a user interface 1170 and/or a user program 1180. User program 1180 can, for example, be adapted to obtain, store, and/or accumulate information related to machine 1100. For example, user program 1180 can store, process, calculate, and/or analyze information provided by sensors 1120, 1130, 1140 as machine 1100 operates and/or functions, etc. User interface 1170 can be adapted to receive user input and/or render output to a user, such as information provided by and/or derived from sensors 1120, 1130, 1140 as machine 1100 operates and/or functions, etc.

Information device 1160 can be adapted to process information related to any of sensors 1120, 1130, 1140. For example, information device 1160 can detect and/or anticipate a problem related to machine 1100. Information device 1160 can be adapted to notify a user with information regarding machine 1100.

Any of sensors 1120, 1130, 1140, and/or information device 1160 can be communicatively coupled to a wireless transmitter and/or transceiver 1150. Wireless transceiver 1150 can be adapted to communicate data related to machine 1100 to a second wireless receiver and/or transceiver 1200. Data related to machine 1100 can comprise electrical measurements and/or variables such as voltages, currents, resistances, and/or inductances, etc.; mechanical measurements and/or variables such as torques, shaft speeds, and/or accelerations, etc.; temperature measurements and/or variables such as from a motor, bearing, and/or transformer, etc.; pressure measurements and/or variables such as air and/or lubrication pressures; production data and/or variables (e.g. weight and/or load related data) such as dipper load, truck load, last truck load, shift total weight; and/or time measurements; motion control measurements and/or variables such as, for certain movable machine components, power, torque, speed, and/or rotor currents; etc.

A network 1300 can communicatively couple wireless transceiver 1200 to devices such as an information device 1500 and/or a server 1400. Server 1400 can be adapted to receive information transmitted from machine 1100 via wireless transceiver 1150 and wireless transceiver 1200. Server 1400 can be communicatively coupled to a memory device 1600. Memory device 1600 can be adapted to store information from machine 1100. Memory device 1600 can store information, for example, in a format compatible with a database standard such as XML, Microsoft SQL, Microsoft Access, MySQL, Oracle, FileMaker, Sybase, and/or DB2, etc.

Server 1400 can comprise an input processor 1425 and a storage processor 1450. Input processor 1425 can be adapted to receive representative data, such as data generated by sensors 1120, 1130, 1140, from wireless transceiver 1200. The representative data can be transmitted responsive to a transmission rate selected by a wirelessly receiving user. Storage processor 1450 can be adapted to store representative data generated from sensors 1120, 1130, 1140 on memory device 1600.

Information device 1500 can be adapted to obtain and/or receive information from server 1400 related to machine 1100. Information device 1500 can comprise a user interface 1560 and/or a client program 1540. Client program 1540 can, for example, be adapted to obtain and/or accumulate information related to operating and/or maintaining machine 1100. Client program 1540 can be adapted to notify a user via user interface 1560 with information indicative of a current or pending failure related to machine 1100. Information device 1500 can communicate with machine 1100 via wireless transceiver 1200 and wireless transceiver 1150. Information device 1500 can notify and/or render information for the user via user interface 1520.

Information device 1500 can comprise an input processor 1525 and a report processor 1575. In certain exemplary embodiments, input processor 1525 can be adapted to receive representative data, such as data generated by and/or derived from sensors 1120, 1130, 1140. The representative data can be transmitted responsive to a data transmission rate selected by a wirelessly receiving user. Report processor 1575 can be adapted to render at least one report responsive to received and/or representative data, such as data obtained from, for example, memory device 1600.

Figure 2:
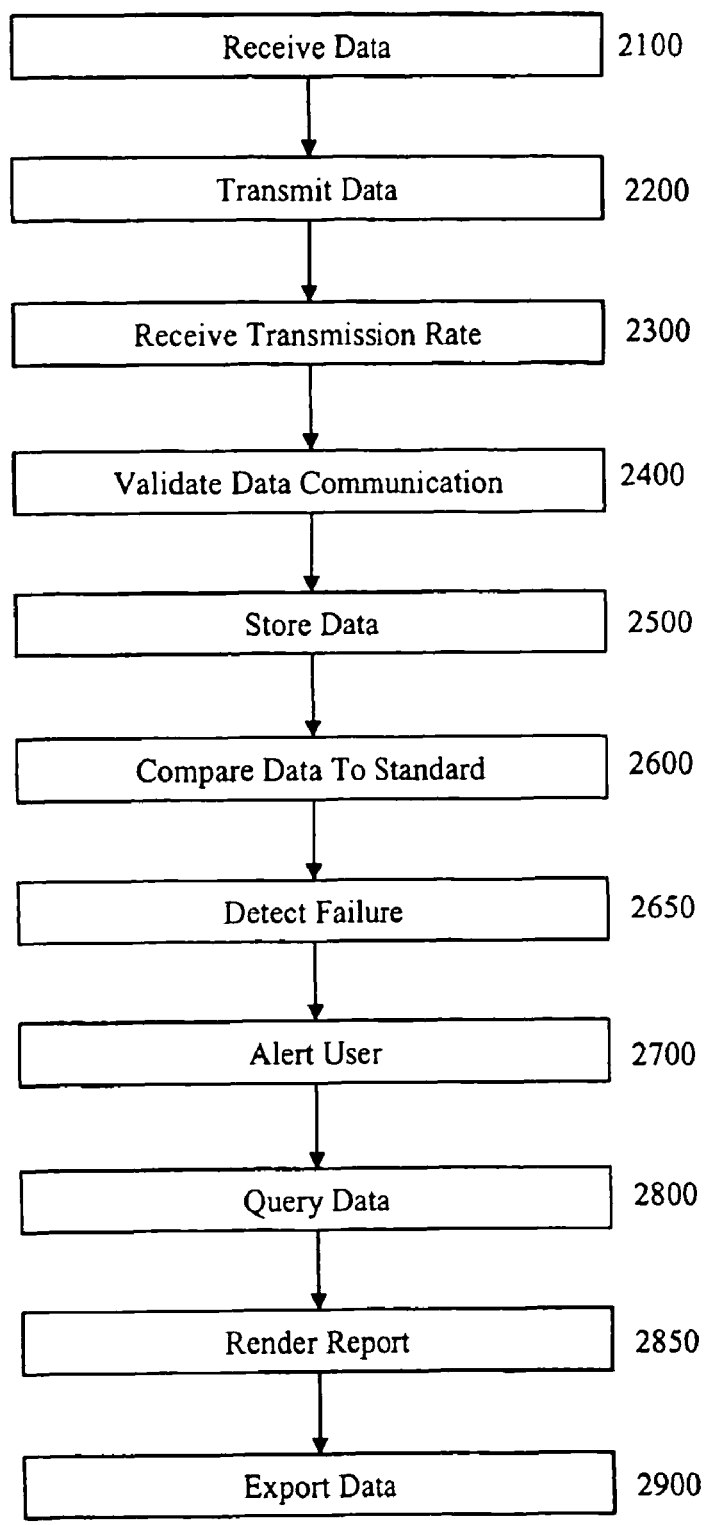
FIG. 2 is a flow diagram of an exemplary embodiment of a machine data management method 2000.

FIG. 2 is a flow diagram of an exemplary embodiment of a data management method 2000 for a machine. Data management method 2000 can be used for reporting, improving, optimizing, predicting, and/or analyzing operations related to activities such as mining, driving, and/or manufacturing, etc. At activity 2100, data can be received at an information device associated with the machine. In certain exemplary embodiments, the information device can be local to the machine. The information device can be adapted to store, process, filter, correlate, transform, compress, analyze, report, render, and/or transfer the data to a first wireless transceiver, etc.

In certain exemplary embodiments, the information device can be remote from the machine. The information device can receive data transmitted via a first wireless transceiver associated with the machine and a second wireless transceiver remote from the machine. The information device can be adapted to receive the data indirectly via a memory device. The information device can be adapted to integrate information from a plurality of sources into a database. Integrating information can comprise associating data values from a plurality of sources to a common timeclock.

In certain exemplary embodiments the data can comprise an initialization file. The initialization file can be transmitted to and/or received by a server that can be remote from the machine. The initialization file can comprise identification information related to the machine. The initialization file can comprise, for example, a moniker associated with the machine, a type of the machine, an address of the machine, information related to the transmission rate of data originating at the machine, transmission scan interval, log directory, time of day to start a log file, and/or information identifying the order in which data is sent and/or identification information relating to sensors associated with the machine from which data originates.

In certain exemplary embodiments, data can be received from a machine dispatch entity that can comprise information related to the actions of a machine dispatcher, haulage machines associated with an excavation machine, equipment scheduling, personnel scheduling, maintenance schedules, historical production data, and/or production objectives, etc.

At activity 2200, the data can be transmitted. The data can be transmitted via the first wireless transceiver to the second wireless transceiver. The second wireless transceiver can transmit the information via a wired and/or wireless connection to at least one wirelessly receiving information device to be stored, viewed, and/or analyzed by at least one wirelessly receiving user and/or information device. In certain exemplary embodiments, transmitted data can be routed and/or received by a remote server communicatively coupled to, for example, the second wireless transceiver via a network.

In certain exemplary embodiments, the data can comprise information relating to a status of the machine. The status of the machine can comprise, for example, properly operating, shut down, undergoing scheduled maintenance, operating but not producing a product, and/or relocating, etc. The status of the machine can be provided to and/or viewed by the user via a user interface.

At activity 2300, a transmission rate can be received at an apparatus and/or system associated with the machine and adapted to adjust transmissions from the machine responsive to the transmission rate. The transmission rate can be received from a second information device remote from the machine and/or the wirelessly receiving user. The transmission rate can be related to a transmission rate between at least the first wireless transceiver and the second wireless transceiver, and/or a sampling rate associated with data supplied from at least one sensor to the first wireless transceiver. The user can specify a transmission rate via a rendered user interface on an information device. In certain exemplary embodiments, the transmission rate can be selected via the rendered user via, for example, a pull down menu, radio button, and/or data entry cell, etc.

At activity 2400, a data communication can be validated. For example, the first wireless transceiver can query and/or test transmissions from the second wireless receiver in order to find, correct, and/or report errors in at least one data transmission. In certain exemplary embodiments, a user can be provided with a status related to the data communication via a user interface based rendering.

At activity 2500, data can be stored pursuant to receipt by an information device. The information device can store the data in a memory device. The data can be stored in a plurality of formats such as SQL, MySQL, Microsoft Access, Oracle, FileMaker, Excel, SYLK, ASCII, Sybase, XML, and/or DB2, etc.

At activity 2600, data can be compared to a standard. The standard can be a predetermined value, limit, data point, and/or pattern of data related to the machine. Comparing data to a standard can, for example, determine a past, present, or impending mechanical failure; electrical failure; operator error; operator performance; and/or supervisor performance, etc.

At activity 2650, a failure can be detected. The failure can be associated with a mechanical and/or electrical component of the machine. For example, the mechanical failure can relate to a bearing, wear pad, engine, gear, and/or valve, etc. The electrical failure can relate to a connecting wire, motor, motor controller, starter, motor controller, transformer, capacitor, diode, resistor, and/or integrated circuit, etc.

At activity 2700, a user can be alerted. The user can be local to the machine and/or operating the machine. In certain exemplary embodiments, the user can be the wirelessly receiving user, the dispatch entity, a management entity, and/or a maintenance entity. The user can be automatically notified to schedule and/or perform a maintenance activity associated with the machine.

At activity 2800, data can be queried. The data related to the machine can be parsed and or extracted from a memory device. The data can be compared to a predetermined threshold and/or pattern. The data can be summarized and/or reported subsequent to the query. Querying the data can allow the wirelessly receiving user to manipulate and/or analyze the data related to the machine. In certain exemplary embodiments the data can be queried using a Machine Search Language engine.

Certain exemplary embodiments can monitor the machine while the machine is operating. Machine analysis functions can evaluate events associated with the machine. Machine analysis functions can determine causes of events and/or conditions that precede one or more events, such as a failure. Received data can be analyzed to detect average, below average, and/or above average performance associated with the machine. The information associated with the machine can be correlated with the dispatch system. In certain exemplary embodiments, applications can be customized towards individualized needs of operational units associated with the machine, such as a mine.

Certain exemplary embodiments can be adapted to remotely visualize operations associated with the machine from a perspective approximating that of an operator of the machine. Continuous monitoring and logging can take away "right timing" constraints on making direct observations of the machine. That is, performance can be logged and reviewed at a later time.

At activity 2850, a report can be rendered. The report can comprise a summary of the data and/or exceptions noted during an analysis of the data. The report can comprise information related to, for example, actual torques, speeds, operator control positions, dispatch data, production, energy use associated with the machine, machine position, machine motion, and/or cycle times associated with the machine, etc. The report can comprise information related to the operation of the machine. For example, wherein the machine is a mining shovel, the report can comprise information related to the mining shovel digging, operating but not digging, propelling, idling, offline, total tons produced in a predetermined time period, total haulage machines loaded in the predetermined time period, average cycle time, average tons mined, and/or average haulage machine loads transferred, etc. The report can provide operating and/or maintenance entities with information related to the machine; recommend a course of action related to the operation and/or maintenance of the machine; historical and/or predictive information; trends in data, machine production data; and/or at least one deviation from an expected condition as calculated based upon the data; etc.

In certain exemplary embodiments, the data can be rendered and/or updated via a user interface in real-time with respect to the sensing of the physical properties underlying the data, and/or the generation, collection, and/or transmission of the data from the machine. The user interface can be automatically updated responsive to updates and/or changes to the data as received from the machine. In certain exemplary embodiments data can be rendered via the user interface from a user selected subset of sensors of a plurality of sensors associated with the machine. In certain exemplary embodiments data can be rendered via the user interface from a user selected subset of data point, such as, for example, every $8^{th}$ data point, every data point having a value outside a predetermined limit, every data point corresponding to a predetermined event, etc. The user can select a time period over which historical data can be rendered via the user interface. In this manner the user can analyze historical events in order to determine trends and/or assist in improving machine operations and/or maintenance.

In certain exemplary embodiments data from the machine can be rendered via the user interface which can comprise a 2-dimensional, 3-dimensional, and/or 4-dimensional (e.g., animated, or otherwise time-coupled) schematic model of the machine. The schematic model of the machine can assist the user in visualizing certain variables and/or their effects related to the machine. The schematic model of the machine can reflect a position of the machine relative to a fixed location, geographical position, and/or relative to another machine, etc. The schematic model can comprise proportionally accurate graphics and/or quantitative and/or qualitative indicators of conditions associated with one or more machine components. For a mining shovel, for example, the plurality of machine components can comprise hoist rope length, stick extension, and/or swing angles, etc. The rendering can comprise graphical indicators of joystick positions and the status displays that an operating entity can sense while running the machine. In this way, the rendering can be adapted to show a mechanical response of the machine under a given set of conditions and/or how the operating entity judges the mechanical response. The rendering can comprise an electrical response of the machine and/or how the operating entity judges the electrical response. In certain exemplary embodiments, data rendered from the machine can comprise GPS based positioning information related to the machine. The data can comprise information related to a survey. For example, in a mining operation, mine survey information can be integrated with positioning information related to the machine.

The rendering can comprise production information related to the machine. In the case wherein the machine is an electric mining shovel, production information can comprise a bucket load, haulage machine load, last haulage machine load, shift total, and/or cycle timer value, etc. The rendering can comprise electrical information such as, for example, readings from line gauges, power gauges, line strip charts, power strip charts, and/or temperature sensors related to an electrical component such as a transformer, etc. The rendering can comprise mechanical information such as, for example, readings from temperature sensors related to a mechanical component such as a bearing, air pressure sensors, lubrication system pressure sensors, and/or vibration sensors, etc.

In certain exemplary embodiments data can be rendered via a user interface in one or more of a plurality of display formats. For example, data can be rendered on a motion strip chart, motion XY plot, and/or motion gauge, etc. Data can be rendered on a chart comprising a minimum and/or maximum pointer associated with the data. The minimum and/or maximum pointer can provide a comparison of a value of a process variable with a predetermined value thereby potentially suggesting that some form of intervention be undertaken. Certain exemplary embodiments can comprise a feature adapted to allow the minimum and/or maximum to be reset and/or changed. For example, the minimum and/or maximum can be changed as a result of experience and/or a change in design and/or operation of the machine. The minimum and/or maximum can be changed by, for example, an operating entity, management entity, and/or engineering entity, etc.

The rendering can comprise elements of graphic user interface, such as menu selections, buttons, command-keys, etc., adapted to save, print, change cursors, and/or zoom, etc. Certain exemplary embodiments can be adapted to allow the user to select a subset of sensors and/or data associated with the machine to be rendered. Certain exemplary embodiments can be adapted to allow the user to select a time range over which the data is rendered. Certain exemplary embodiments can be adapted to provide the user with an ability to load and play log files via the rendering. Rendering commands can include step forward, forward, fast forward, stop, step back, play back, and/or fast back, etc. Additional features can be provided for log positioning. Certain exemplary embodiments can comprise a drop down box adapted to accept a user selection of time intervals and/or a start time.

At activity 2900, data can be exported. Data can be exported from a memory device. Data can be exported in a plurality of formats. For example, data formatted as a SQL database can be exported in a Microsoft Access database format, an ASCII format, and/or a Microsoft Excel spreadsheet format, etc.

Figure 3:
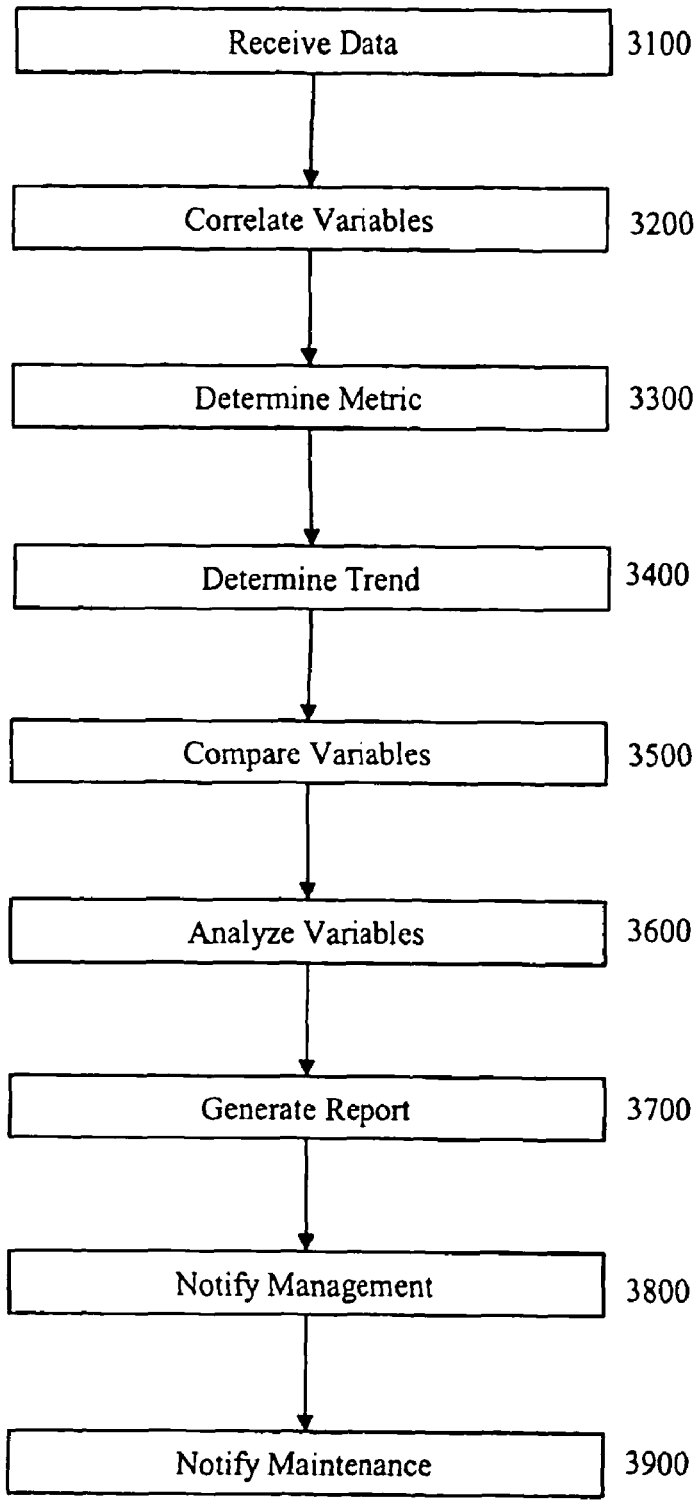
FIG. 3 is a flow diagram of an exemplary embodiment of a machine data management method 3000.

FIG. 3 is a flow diagram of an exemplary embodiment of a machine data management method 3000. At activity 3100, data can be received at a server and/or an information device. The data can comprise a plurality of values for a plurality of machine system variables associated with one or more machine system components. The plurality of machine system variables can comprise operational variables, environmental variables, variables related to maintenance, variables related to mechanical performance of the machine, and/or variables related to electrical performance of the machine, etc. In certain exemplary embodiments, the machine can be an electric mining shovel. The plurality of machine system variables can comprise at least one operational variable. In certain exemplary embodiments, the at least one operational variable can be related to digging earthen material. In certain exemplary embodiments, the at least one operational variable can comprise non-binary values.

At activity 3200, variables from the machine data can be correlated. For example, values for two of the plurality of machine system variables can be mathematically analyzed in order to determine a correlation between those variables. Determining a correlation between variables can, for example, provide insights into improving machine operations and/or reducing machine downtime.

At activity 3300, a metric can be determined. The metric can be a statistical metric related to least one of the machine system variables. The metric can be, for example, a mean, average, mode, maximum, minimum, standard deviation, variance, control chart range, statistical analysis of variance parameter, statistical hypothesis testing value, and/or a deviation from a standard value, etc. Determining the metric can provide information adapted to improve machine operation, improve performance of a machine operating entity, improve performance of a machine dispatching entity, improve machine maintenance, and/or reduce machine downtime, etc.

At activity 3400, the server and/or information device can determine a trend related to at least one of the machine system variables. The trend can be relative to time and/or another machine system variable. Determining the trend can provide information adapted to improve machine design, improve machine operation, improve performance of a machine operating entity, improve performance of a machine dispatching entity, improve machine maintenance, and/or reduce machine downtime, etc.

At activity 3500, values for one or more variables can be compared. In certain exemplary embodiments, values for a variable can be compared to a predetermined standard. For example, a bearing vibration reading can be compared to a predetermined standard vibration amplitude, pattern, phase, velocity, acceleration, etc., the predetermined standard representing a value indicative of an impending failure. Predicting an impending bearing failure can allow proactive, predictive, and/or preventive maintenance rather than reactive maintenance. As another example, a production achieved via the machine can be compared with a predetermined minimum threshold. If the production achieved is less than the predetermined minimum, a management entity can be notified in order to initiate corrective actions. If the production achieved is above the predetermined minimum by a predetermined amount and/or percentage, the management entity can be notified to provide a reward and/or investigate the causes of the production achieved.

As yet another example, an operating temperature for an electric motor controller can be compared to a predetermined maximum. If the operating temperature exceeds the predetermined maximum, a maintenance entity can be notified that a cooling system has failed and/or is non-functional. Repairing the cooling system promptly can help prevent a failure of the electric motor controller due to overheating. As still another example, an electric mining shovel idle time while operating can be compared to a predetermined maximum threshold. If the electric mining shovel idle time exceeds the predetermined maximum threshold, a mine dispatch entity can be notified that at least one additional haulage machine should be assigned to the electric mining shovel in order to improve mine production.

As still another example, a lubrication system pressure and/or use can be compared to predetermined settings. If the lubrication system is down or not performing properly, an operational and/or maintenance entity can be notified. Tracking and/or comparing lubrication system characteristics can be useful in predicting and/or preventing failures associated with inadequate lubrication.

As a further example, machine productivity can be compared to a predetermined standard. For example, in a mining operation for predetermined production period, tons mined can be compared to a historical statistical metric associated with the machine. The machine productivity comparison can provide a management entity with information that can be adapted to improve performance related to a machine operator, a dispatch entity, a maintenance entity, and/or an operator associated with a related machine.

At activity 3600, variables associated with the machine can be analyzed. In certain exemplary embodiments, two correlated variables associated with the machine can be analyzed. In embodiments wherein the machine is an electric mining shovel, the two correlated variables can be non-load-related and/or non-positional variables related to the electric mining shovel.

Analyzing variables associated with the machine can comprise utilizing a pattern classification and/or recognition algorithm such as a decision tree, Bayesian network, neural network, Gaussian process, independent component analysis, self-organized map, and/or support vector machine, etc. The algorithm can facilitate performing tasks such as pattern recognition, data mining, classification, and/or process modeling, etc. The algorithm can be adapted to improve performance and/or change its behavior responsive to past and/or present results encountered by the algorithm. The algorithm can be adaptively trained by presenting it examples of input and a corresponding desired output. For example, the input might be a plurality of sensor readings associated with a machine component and an experienced output a failure of a machine component. The algorithm can be trained using synthetic data and/or providing data related to the component prior to previously occurring failures. The algorithm can be applied to almost any problem that can be regarded as pattern recognition in some form. In certain exemplary embodiments, the algorithm can be implemented in software, firmware, and/or hardware, etc.

Certain exemplary embodiments can comprise analyzing a vibration related to the machine based on values from at least one vibration sensor. The values can relate, for example, to a time domain, frequency domain, phase domain, and/or relative location domain, etc. The values can be presented to the pattern recognition algorithm to find patterns associated with impending failures. The values can be normalized, for example, with respect to a frequency and/or phase of rotation associated with the machine. The values can be used to obtain dynamic information usable in detecting and/or classifying failures.

Failures associated with the machine can be preceded by a condition such as, for example, a changing tolerance, imbalance, and/or bearing wear, etc. The condition can result in a characteristic vibration signature associated with an impending failure. In certain exemplary embodiments, the characteristic vibration signature can be discernable from other random and/or definable patterns within and/or potentially within the values.

Certain exemplary embodiments can utilize frequency normalization of the values. For example, frequency variables associated with power spectral densities can be scaled to predetermined frequencies. Scaling frequency variables can provide clearer representations of certain spectral patterns.

Vibration sensor readings can be sampled and processed at constant and/or variable time intervals. Certain exemplary embodiments can demodulate the vibration sensor readings. In certain exemplary embodiments, a frequency spectrum can be computed via a Fourier transform technique. The pattern recognition algorithm can be adapted to recognize patterns in the frequency spectrum to predict an impending machine component failure.

The pattern recognition algorithm can comprise a plurality of heuristic rules, which can comprise, for example, descriptive characteristics of vibration patterns associated with a failure of the component of the machine. The heuristic rules can comprise links identifying likely causes, diagnostic procedures, and/or effects related to the failure. For example, the heuristic rules can be adapted to adjust maintenance, machine, and/or personnel schedules responsive to detecting an impending failure.

Activity 3600 can comprise, for example, predicting machine performance, predicting a failure related to the machine, predicting a failure related to a machine component, predicting a failure related to a mechanical machine component, and/or predicting a failure related to an electrical machine component.

At activity 3700, a report can be generated. The report can comprise, for example, a machine performance variable; information related to performance of a dispatch entity, such as a mine dispatch entity; information related to performance of a machine mechanical component; information related to performance of an machine electrical component; information related to activities involving the machine, such as digging activities in the case of an electric mining shovel; information related to non-digging activities involving the machine, such as operator training; and/or information related to propelled motion of the machine; etc.

At activity 3800, a management entity associated with the machine can be notified of information related to the machine. The management entity can be notified of certain comparisons associated with activity 3500 and/or results associated with activity 3600. Notifying the management entity can allow for corrective action to be taken to avoid lower than desired performance. Notifying the management entity can provide the management entity with information usable to improve performance related to the machine.

At activity 3900, a maintenance entity associated with the machine can be notified. Notifying the maintenance entity can provide for prompt repair and/or prompt scheduling of a repair associated with the machine. Information obtained via activity 3600 can provide information usable in improving preventative maintenance related to the machine.

Figure 4:
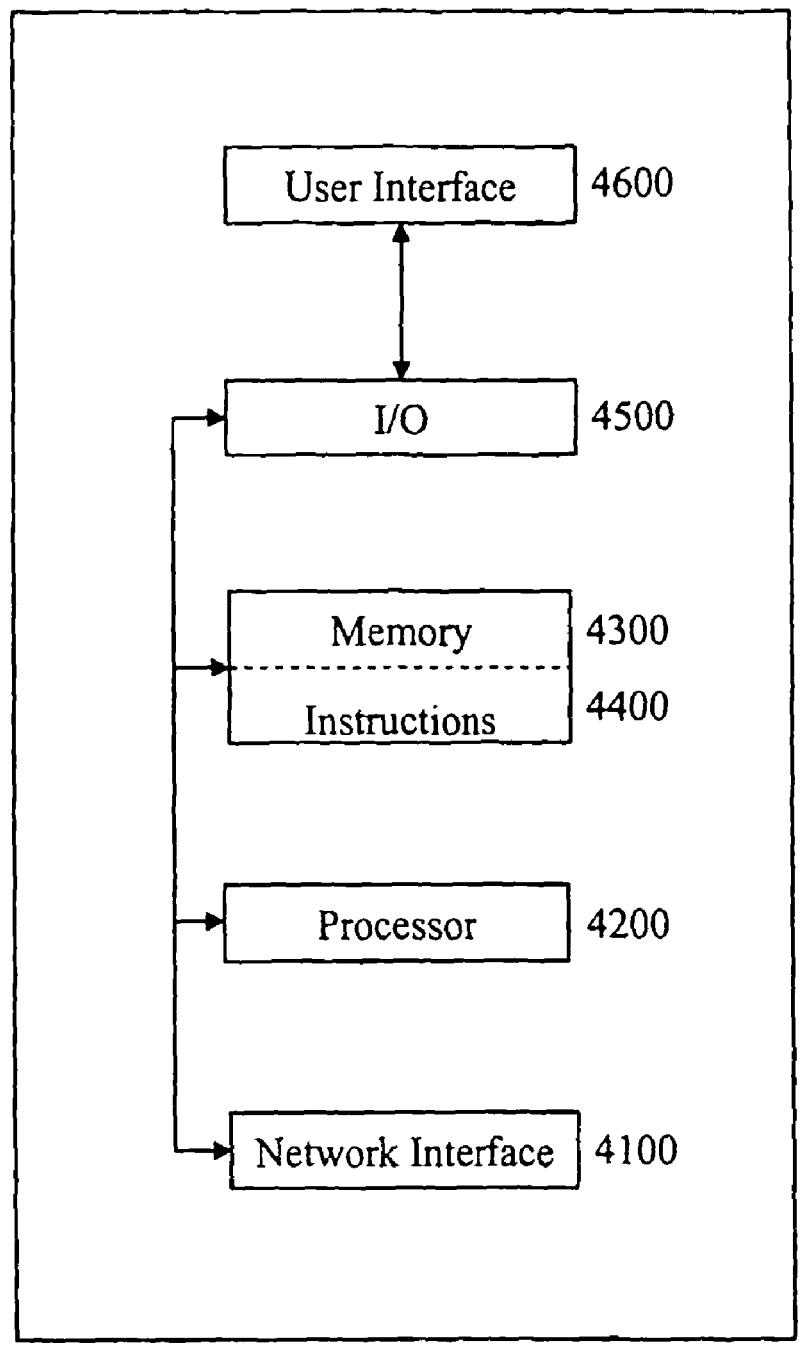
FIG. 4 is a block diagram of an exemplary embodiment of an information device 4000.

FIG. 4 is a block diagram of an exemplary embodiment of an information device 4000, which in certain operative embodiments can comprise, for example, information device 1160, server 1400, and information device 1500 of FIG. 1. Information device 4000 can comprise any of numerous well-known components, such as for example, one or more network interfaces 4100, one or more processors 4200, one or more memories 4300 containing instructions 4400, one or more input/output (I/O) devices 4500, and/or one or more user interfaces 4600 coupled to I/O device 4500, etc.

In certain exemplary embodiments, via one or more user interfaces 4600, such as a graphical user interface, a user can view a rendering of information related to a machine.

FIGS. 5a, 5b, and 5c are an exemplary embodiment of a partial log file layout for data associated with a mining shovel. Data comprised in the log file can be saved for analytical purposes.

Figure 6:
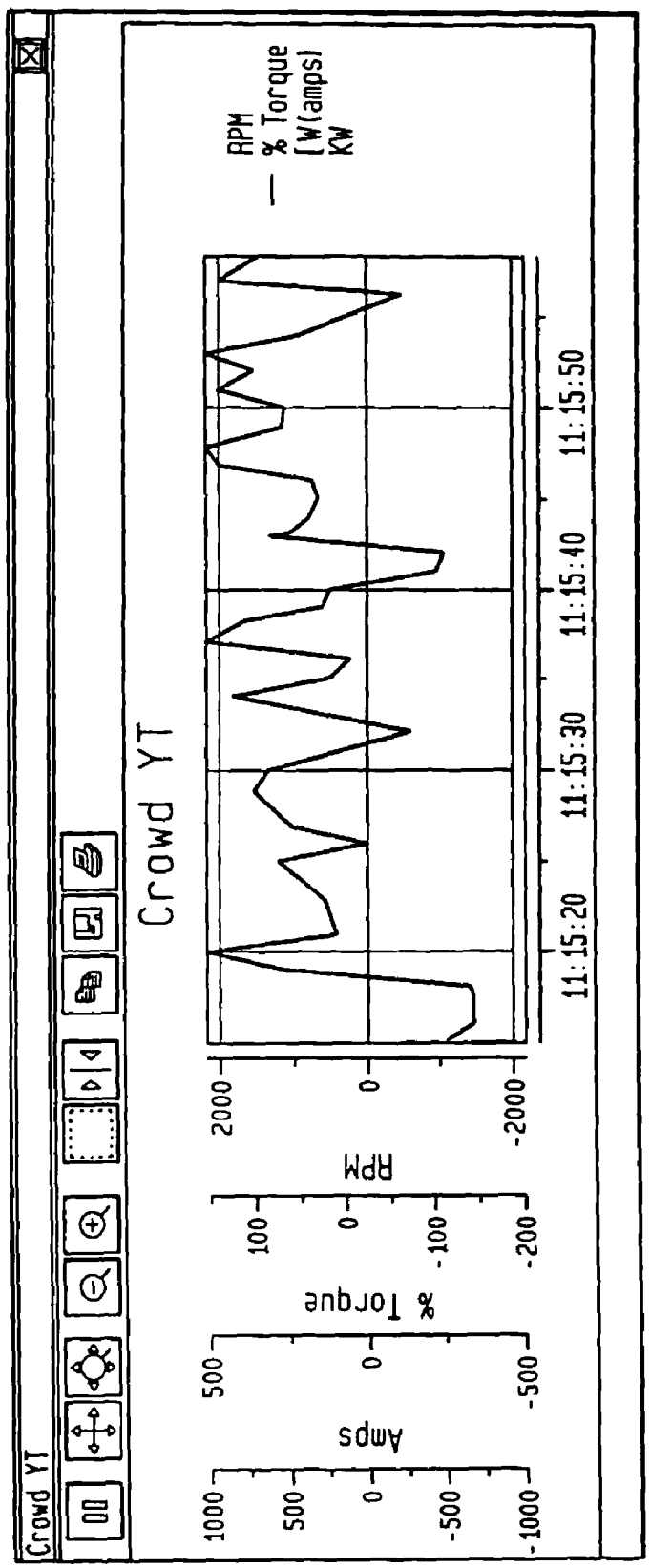
FIG. 6 is an exemplary user interface showing a graphical trend chart of electrical data for a crowd motor of a mining shovel.

FIG. 6 is an exemplary user interface showing a graphical trend chart of electrical data for a crowd motor of a mining shovel. The crowd motor is adaptable to provide motion to a bucket of the mining shovel toward, to "crowd", material holdable by the bucket.

Figure 7:
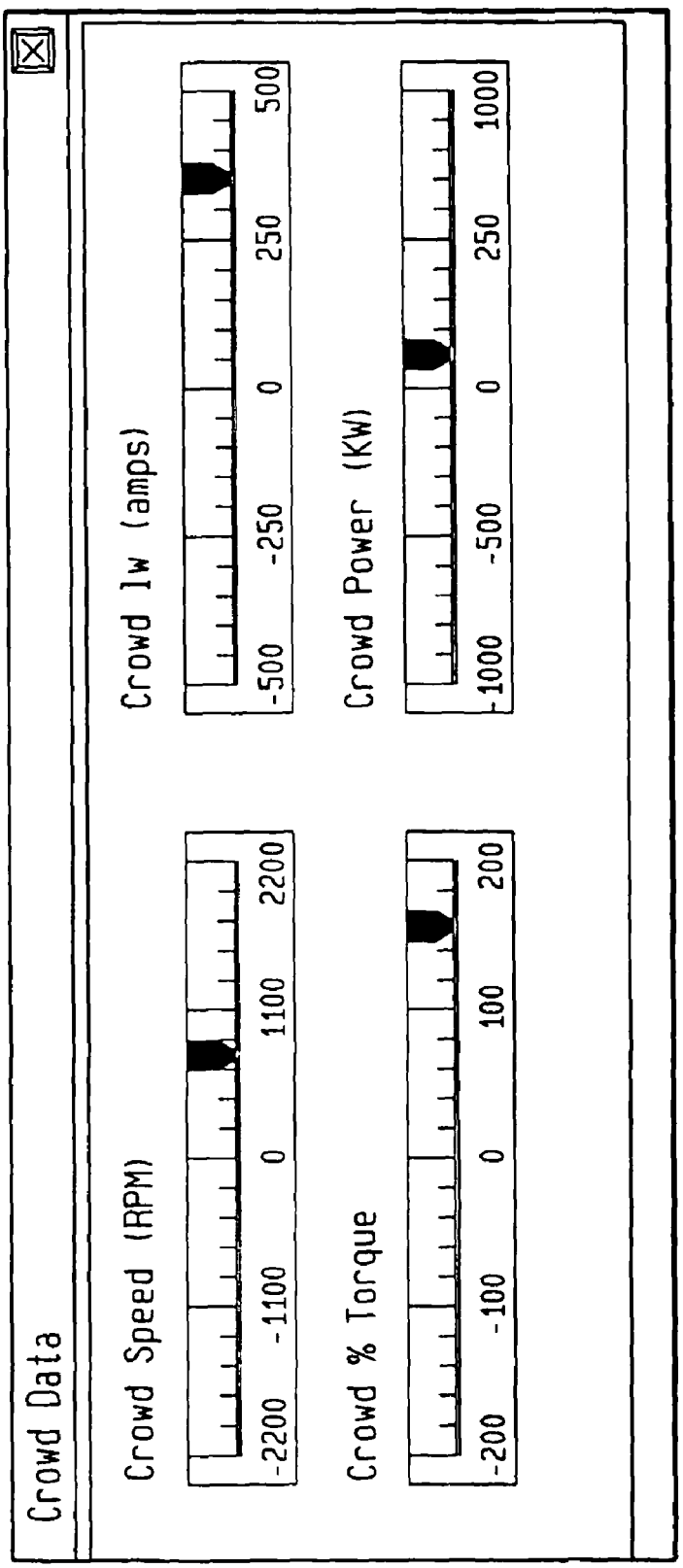
FIG. 7 is an exemplary user interface showing a graphical rendering of gauges displaying electrical data of a crowd motor of a mining shovel.

FIG. 7 is an exemplary user interface showing a graphical rendering of gauges displaying electrical data of a crowd motor of a mining shovel. Data used in generating the graphical rendering can be saved for analytical purposes. The graphical rendering be rendered approximately in real-time.

Figure 8:
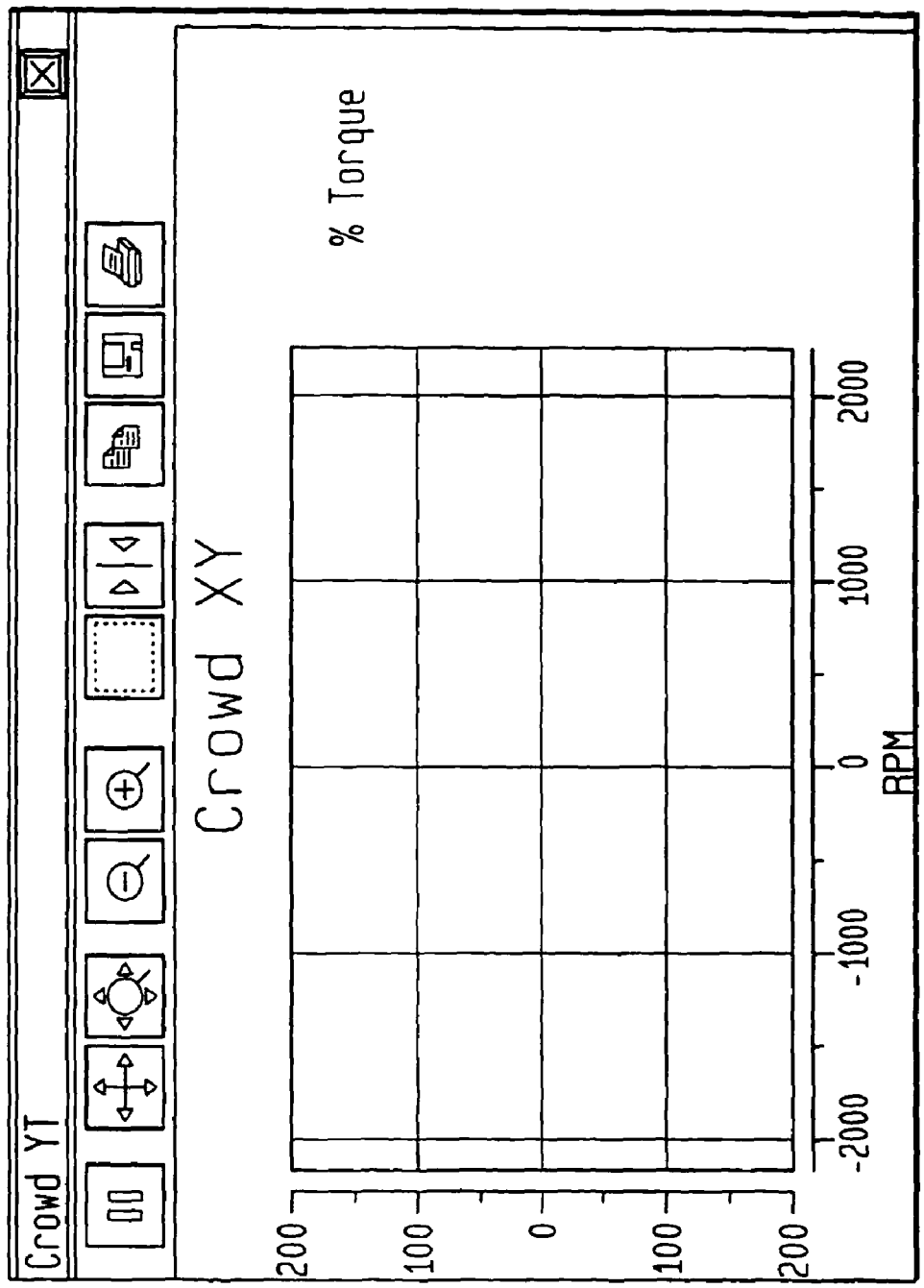
FIG. 8 is an exemplary user interface showing a relationship between speed and torque of a crowd motor of a mining shovel.

FIG. 8 is an exemplary user interface showing a relationship between speed and torque of a crowd motor of a mining shovel.

Figure 9:
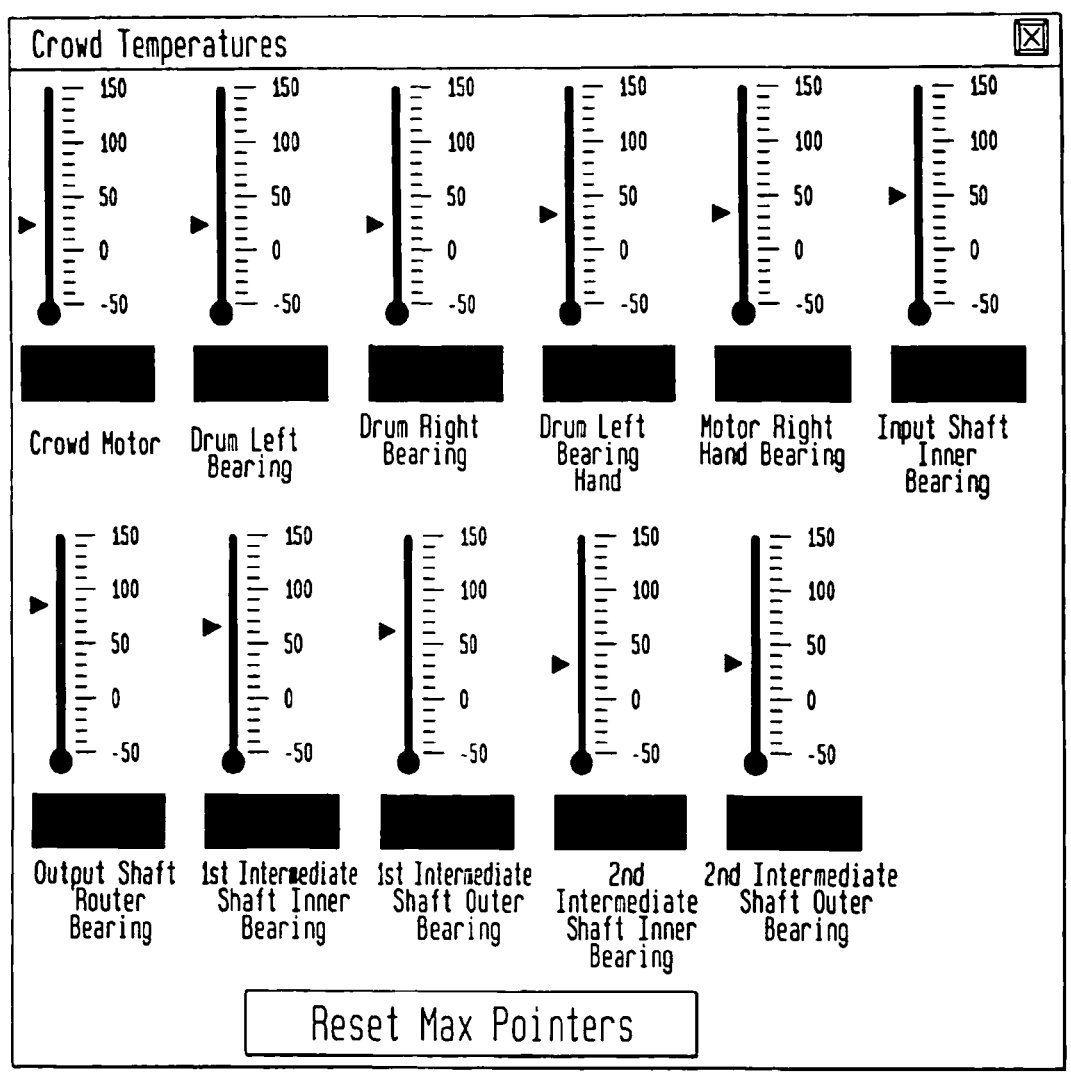
FIG. 9 is an exemplary user interface showing a graphical rendering of gauges displaying temperatures related to a mining shovel crowd.

FIG. 9 is an exemplary user interface showing a graphical rendering of gauges displaying temperatures related to a mining shovel crowd. Data used in generating the graphical rendering can be saved for analytical purposes. The graphical rendering be rendered approximately in real-time.

Figure 10:
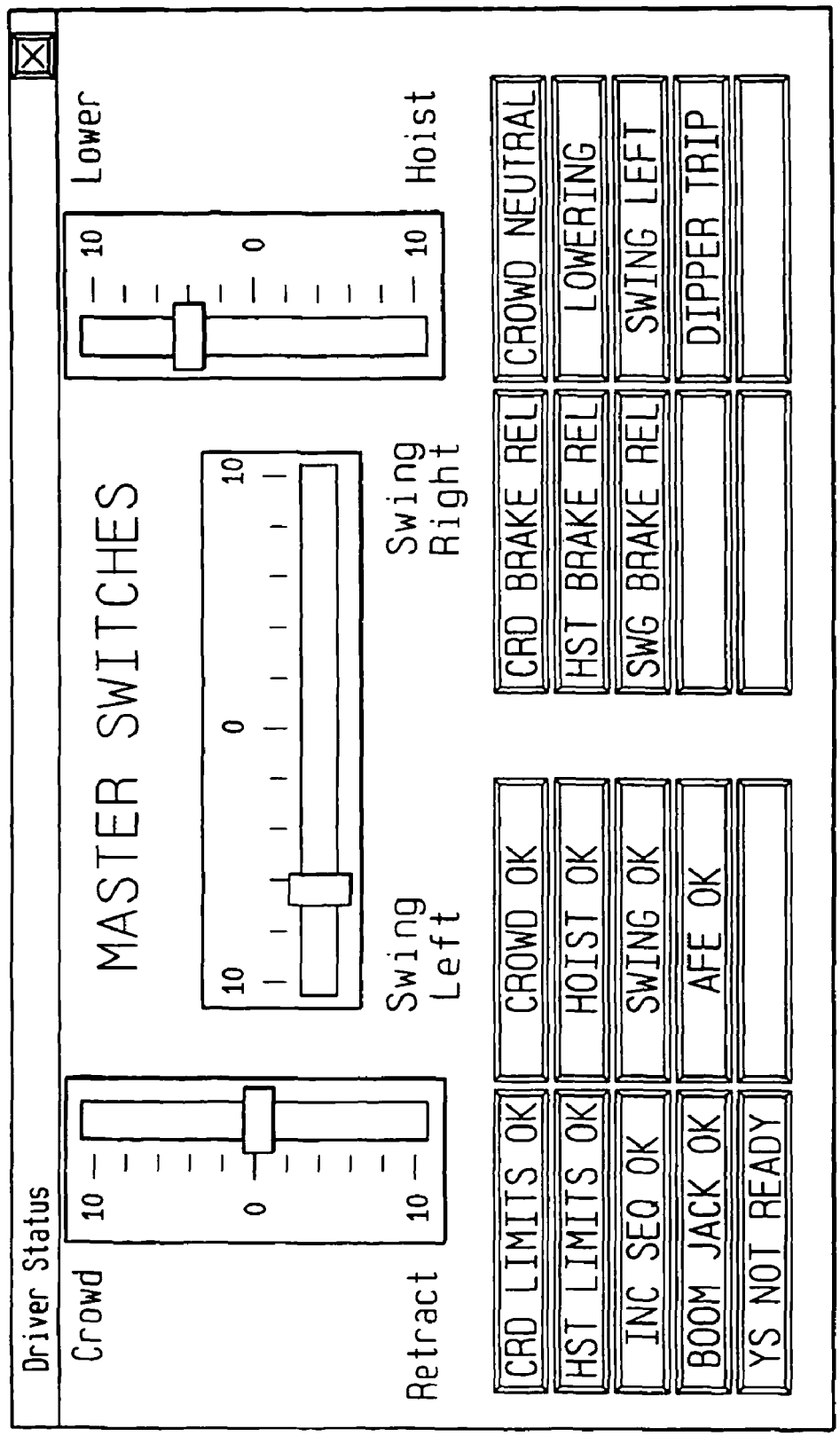
FIG. 10 is an exemplary user interface showing information related to driver operation of a mining shovel.

FIG. 10 is an exemplary user interface showing information related to driver operation of a mining shovel. The graphical rendering be rendered approximately in real-time.

Figure 11:
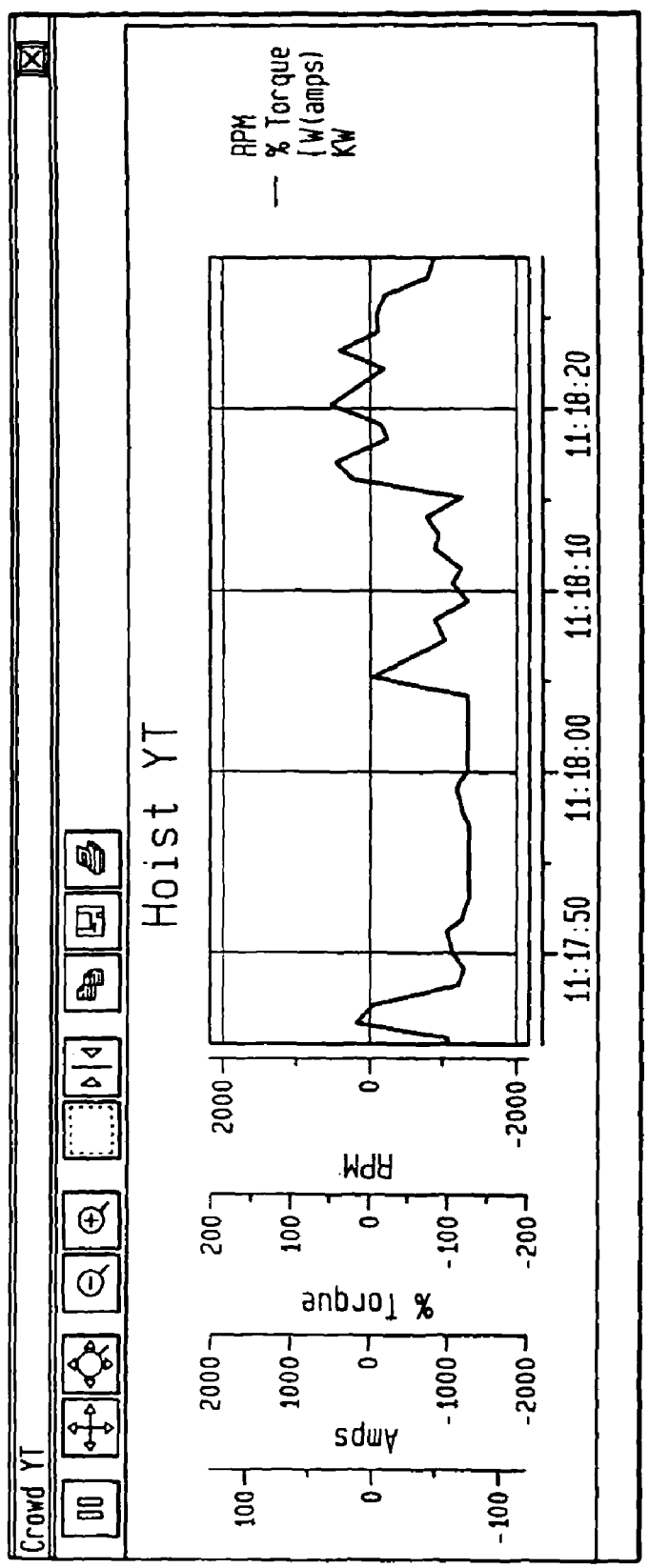
FIG. 11 is an exemplary user interface showing a graphical trend chart of electrical data for a hoist motor of a mining shovel.

FIG. 11 is an exemplary user interface showing a graphical trend chart of electrical data for a hoist motor of a mining shovel.

Figure 12:
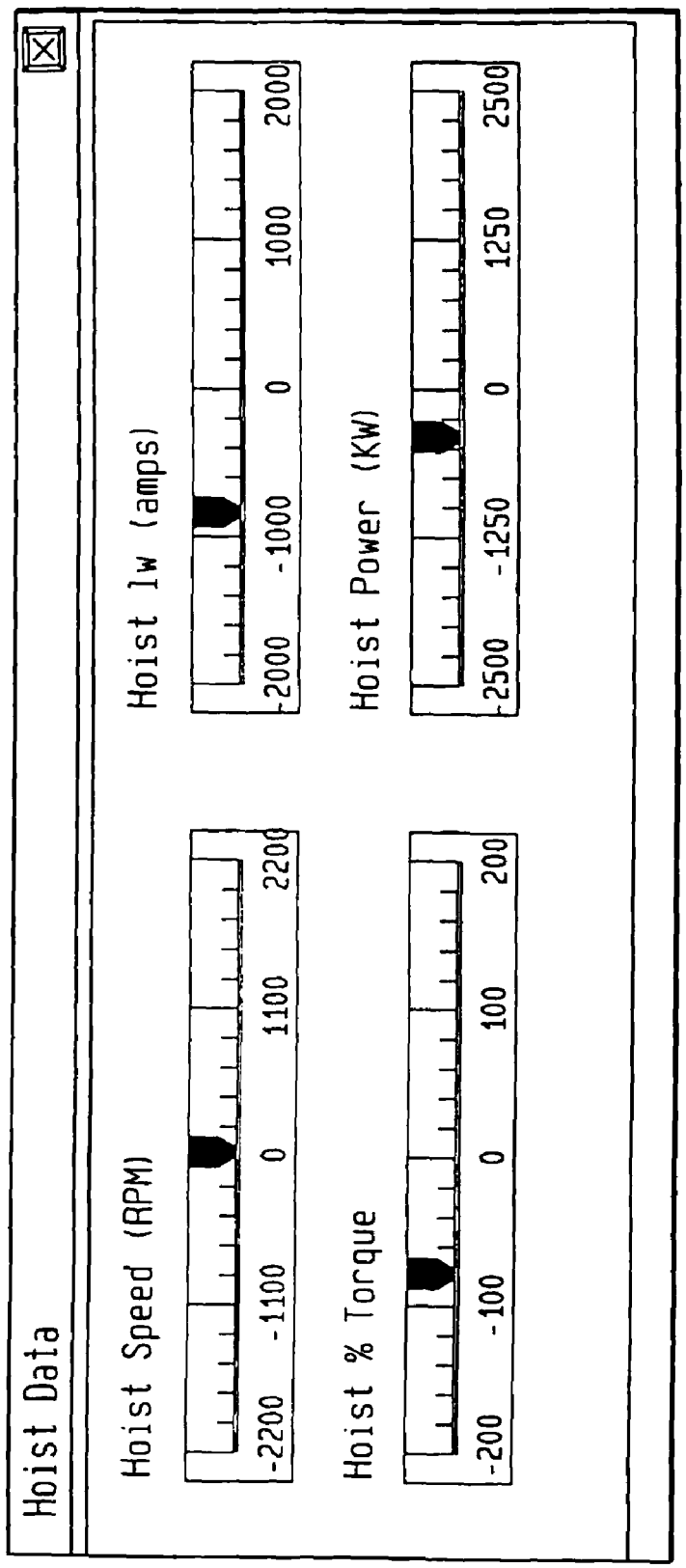
FIG. 12 is an exemplary user interface showing a graphical rendering of gauges displaying electrical data for a hoist motor of a mining shovel.

FIG. 12 is an exemplary user interface showing a graphical rendering of gauges displaying electrical data for a hoist motor of a mining shovel. Data used in generating the graphical rendering can be saved for analytical purposes. The graphical rendering be rendered approximately in real-time.

Figure 13:
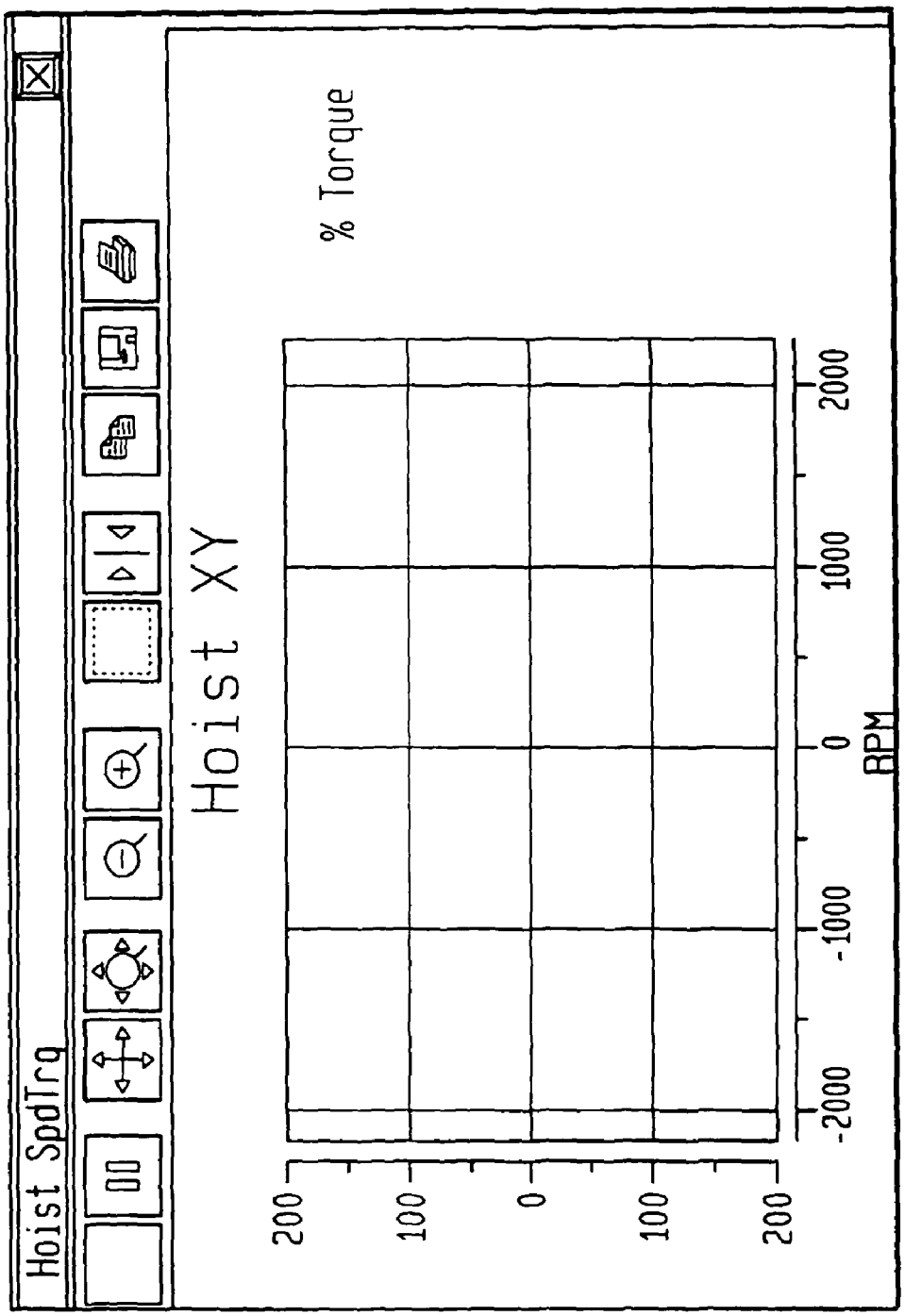
FIG. 13 is an exemplary user interface showing a relationship between speed and torque of a hoist motor of a mining shovel.

FIG. 13 is an exemplary user interface showing a relationship between speed and torque of a hoist motor of a mining shovel.

Figure 14:
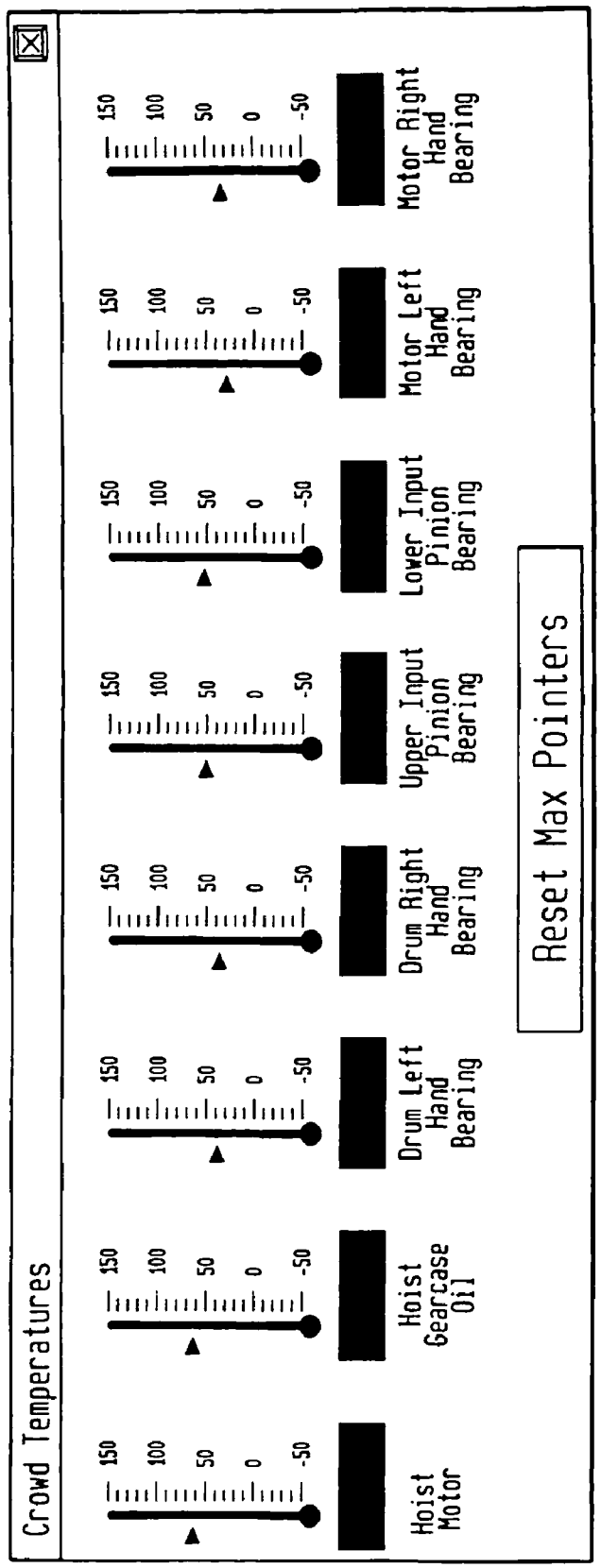
FIG. 14 is an exemplary user interface showing a graphical rendering of gauges displaying temperatures related to a mining shovel hoist.

FIG. 14 is an exemplary user interface showing a graphical rendering of gauges displaying temperatures related to a mining shovel hoist. Data used in generating the graphical rendering can be saved for analytical purposes. Maximum and/or minimum thresholds can be set for purposes of generating alarms and/or flagging data. The graphical rendering be rendered approximately in real-time.

Figure 15:
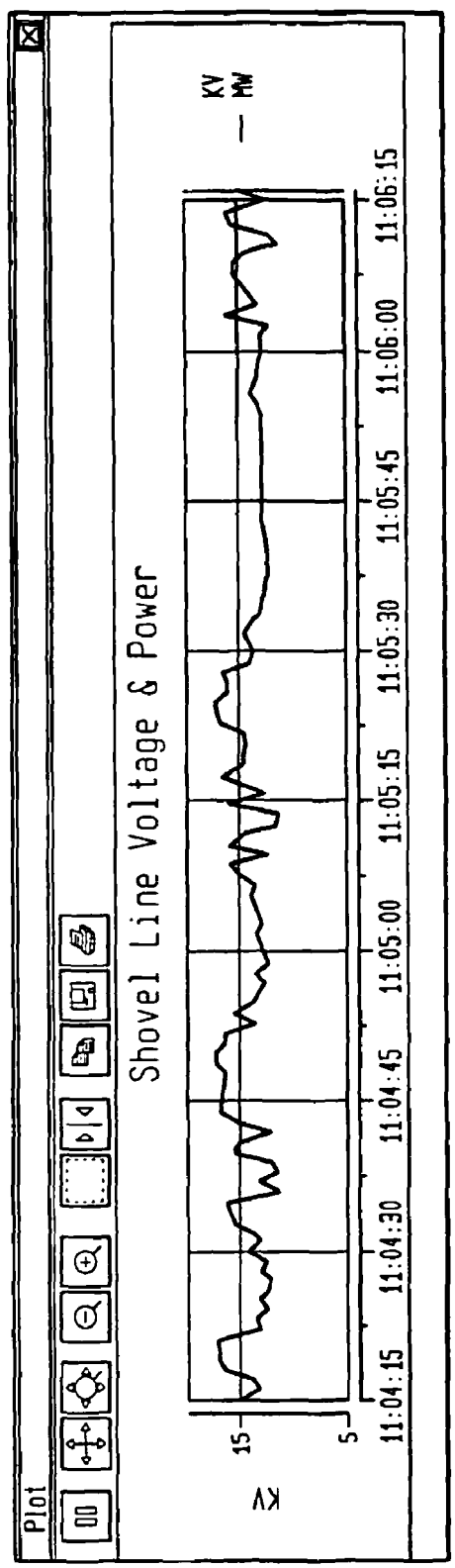
FIG. 15 is an exemplary user interface showing a graphical trend chart of electrical data related to a mining shovel.

FIG. 15 is an exemplary user interface showing a graphical trend chart of electrical data related to a mining shovel.

Figure 16:
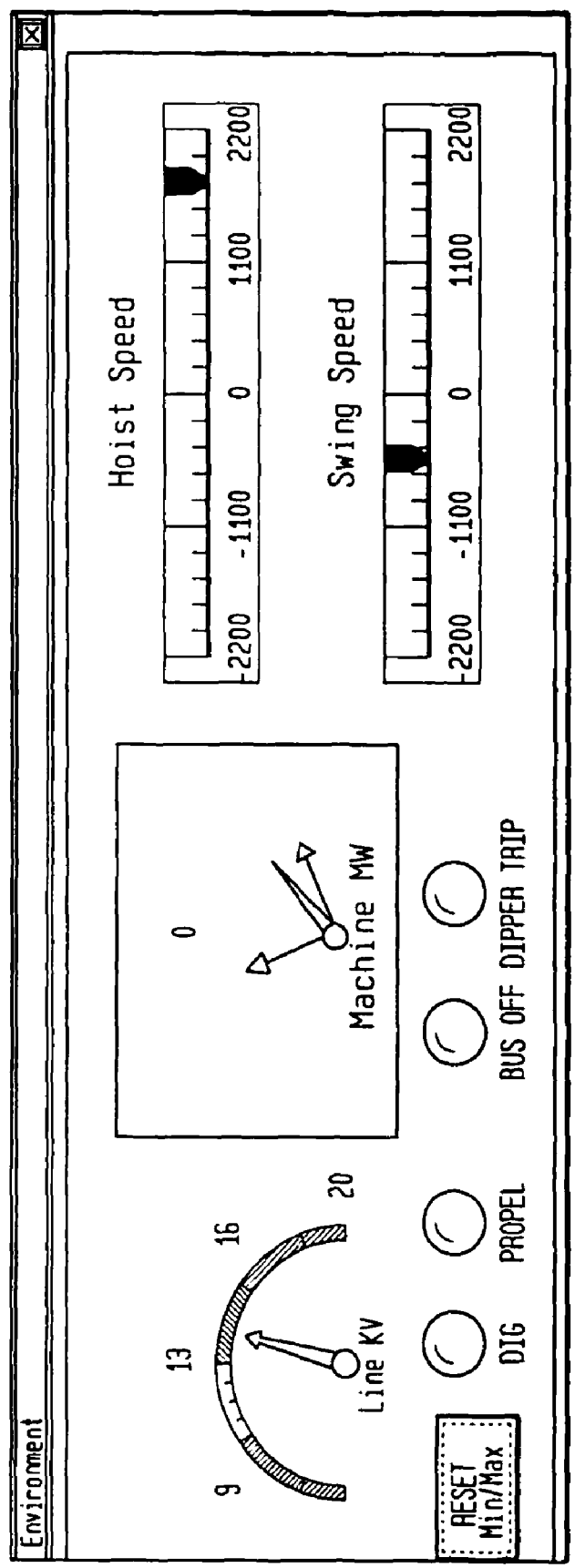
FIG. 16 is an exemplary user interface showing information related to mining shovel operations.

FIG. 16 is an exemplary user interface showing information related to mining shovel operations.

Figure 17:
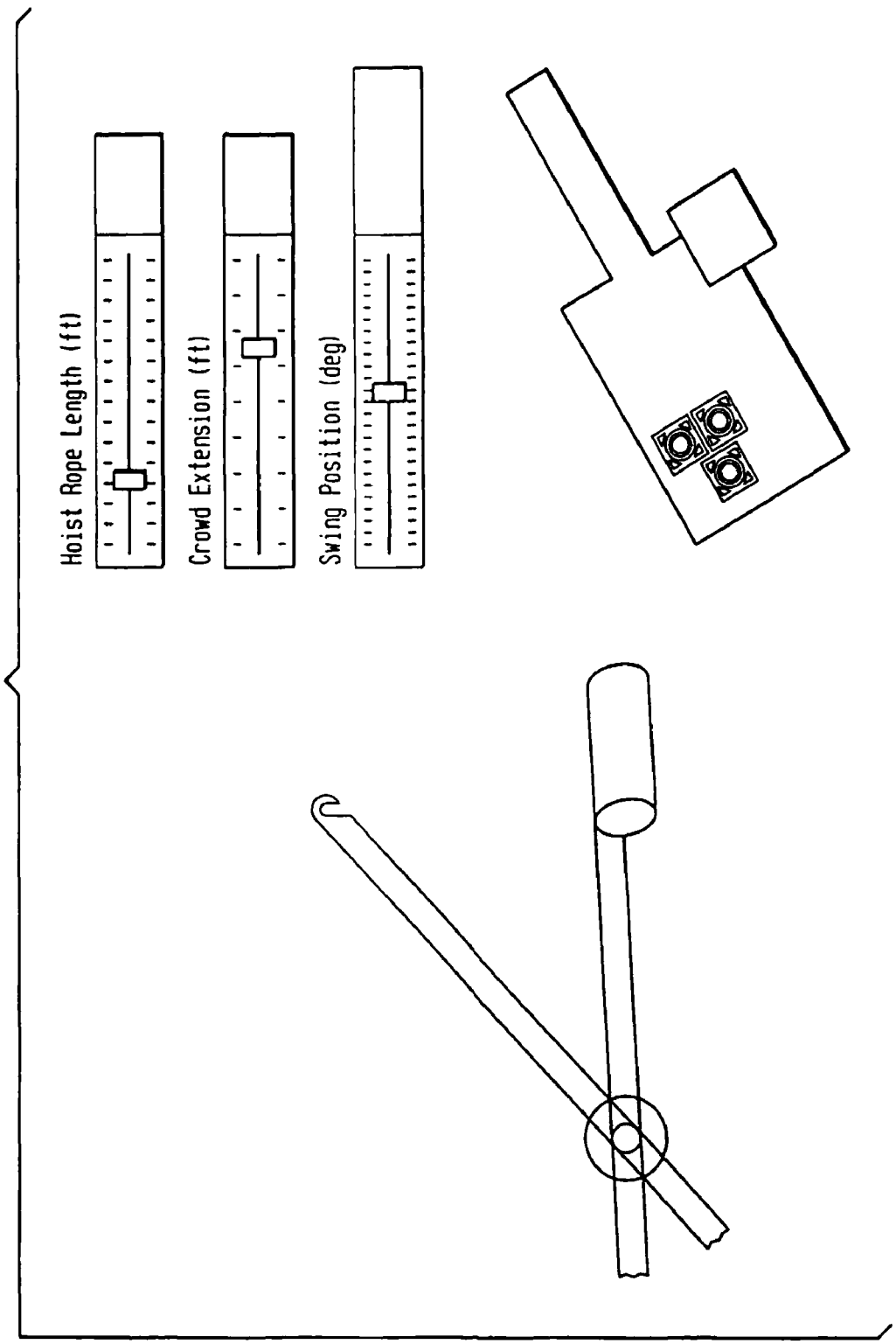
FIG. 17 is an exemplary user interface showing position information related to a mining shovel.

FIG. 17 is an exemplary user interface showing position information related to a mining shovel.

Figure 18:
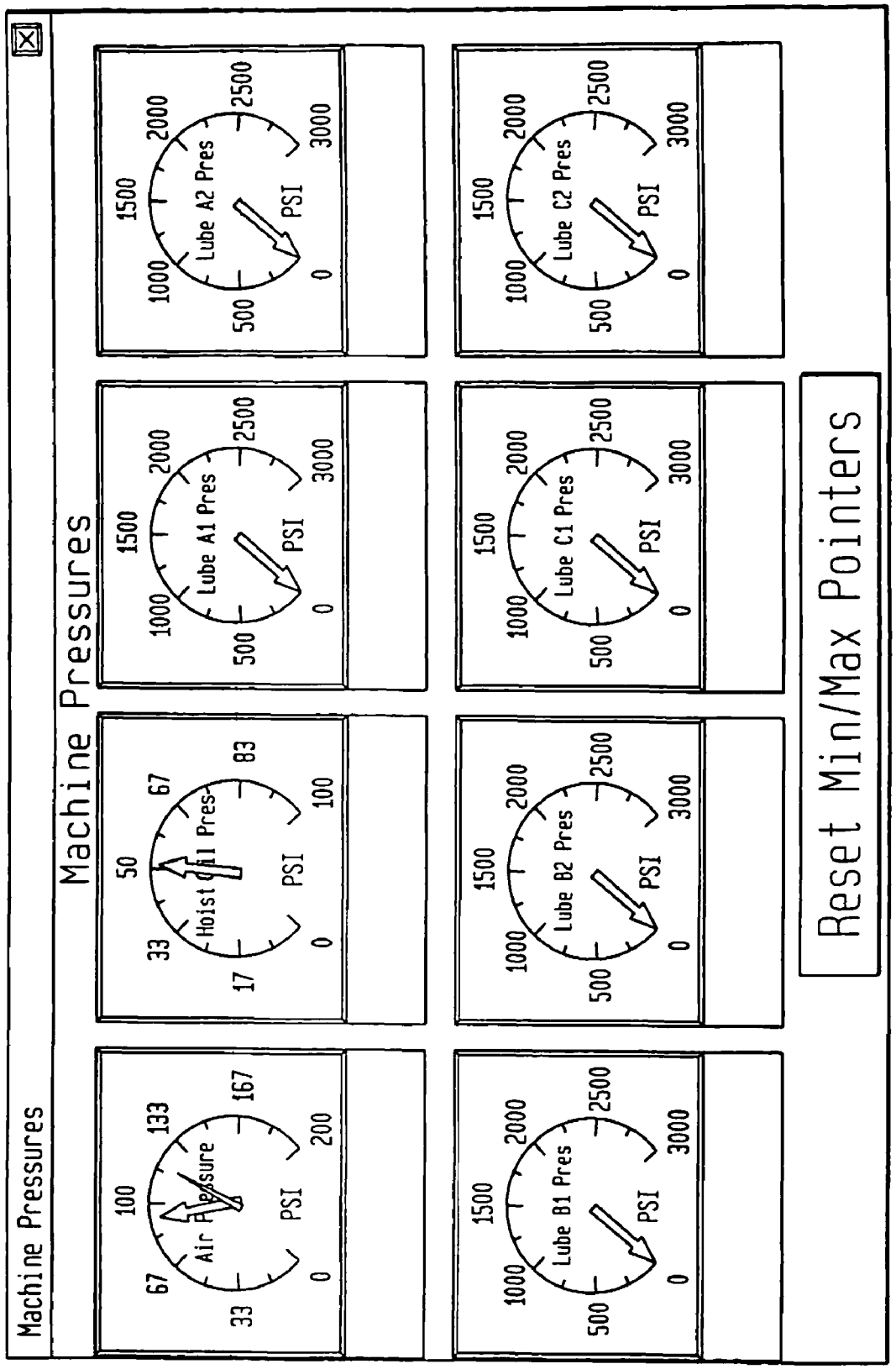
FIG. 18 is an exemplary user interface showing a graphical rendering of gauges displaying pressures of mining shovel components.

FIG. 18 is an exemplary user interface showing a graphical rendering of gauges displaying pressures of mining shovel components. Data used in generating the graphical rendering can be saved for analytical purposes. The graphical rendering be rendered approximately in real-time.

Figure 19:
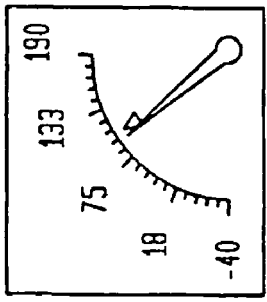
FIG. 19 is an exemplary user interface showing a graphical rendering of gauges displaying temperatures of mining shovel components.

FIG. 19 is an exemplary user interface showing a graphical rendering of gauges displaying temperatures of mining shovel components.

Figure 20:
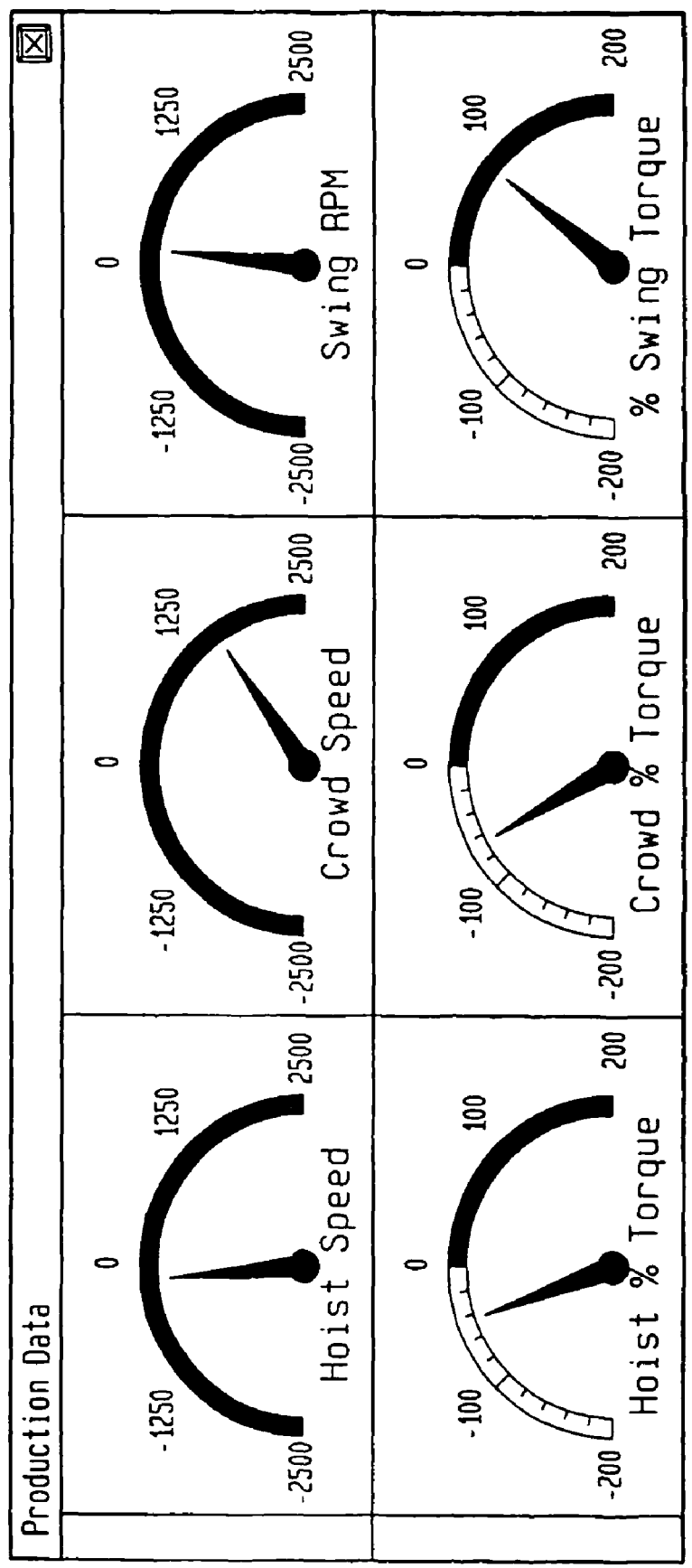
FIG. 20 is an exemplary user interface showing a graphical rendering of gauges displaying electrical data of hoist, crowd, and swing motors of a mining shovel.

FIG. 20 is an exemplary user interface showing a graphical rendering of gauges displaying electrical data of hoist, crowd, and swing motors of a mining shovel.

Figure 21:
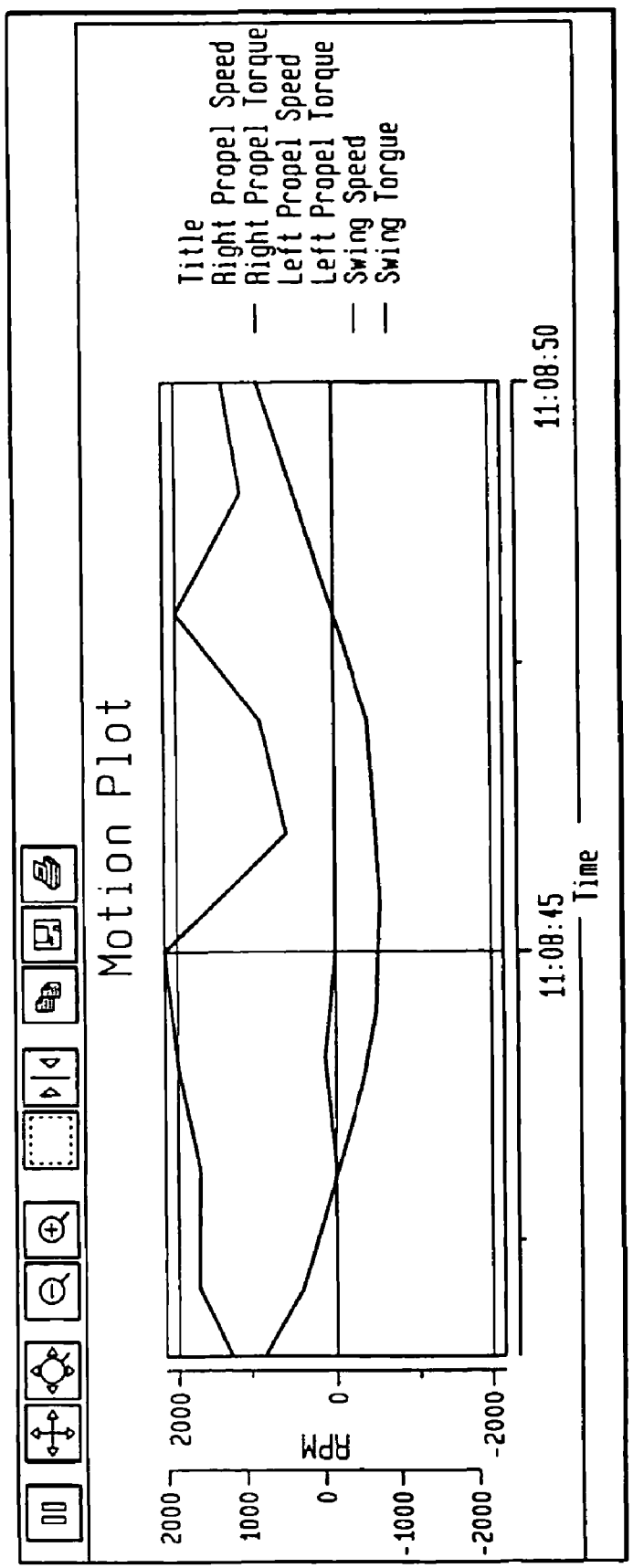
FIG. 21 is an exemplary user interface showing a graphical trend chart of motion data related to a mining shovel.

FIG. 21 is an exemplary user interface showing a graphical trend chart of motion data related to a mining shovel.

Figure 22:
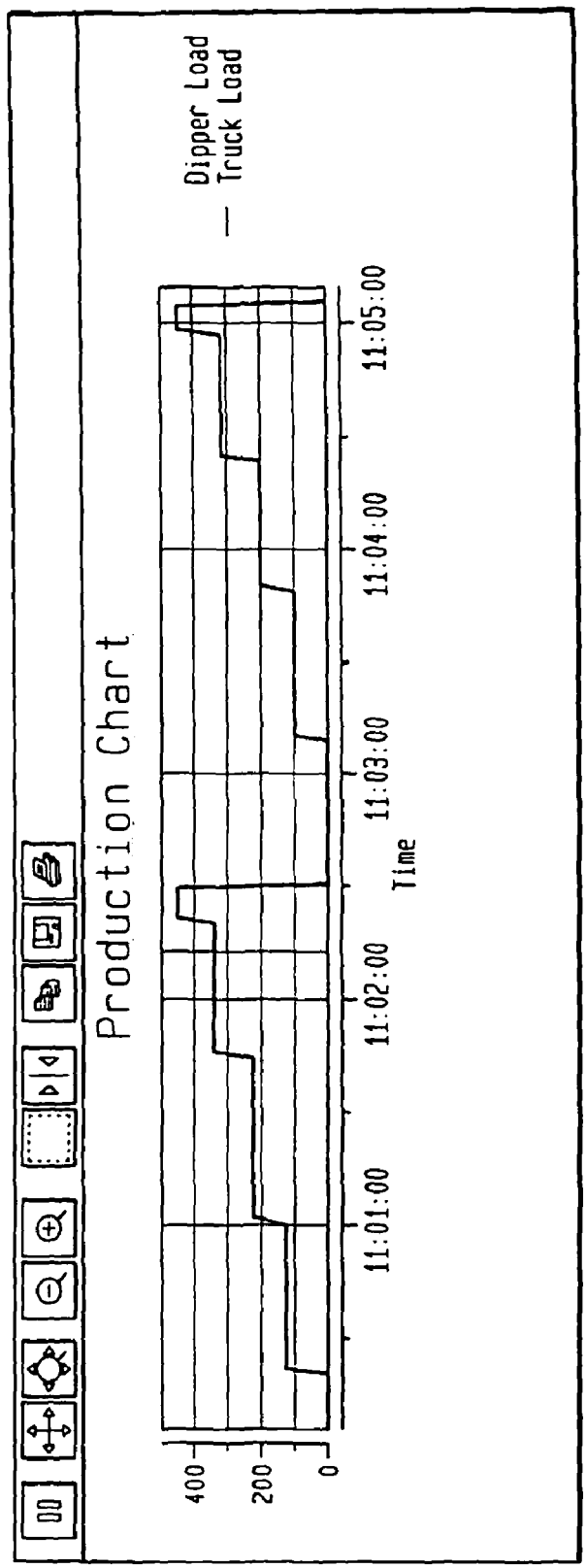
FIG. 22 is an exemplary user interface showing a graphical trend chart of production data related to a mining shovel.

FIG. 22 is an exemplary user interface showing a graphical trend chart of production data related to a mining shovel.

Figure 23:
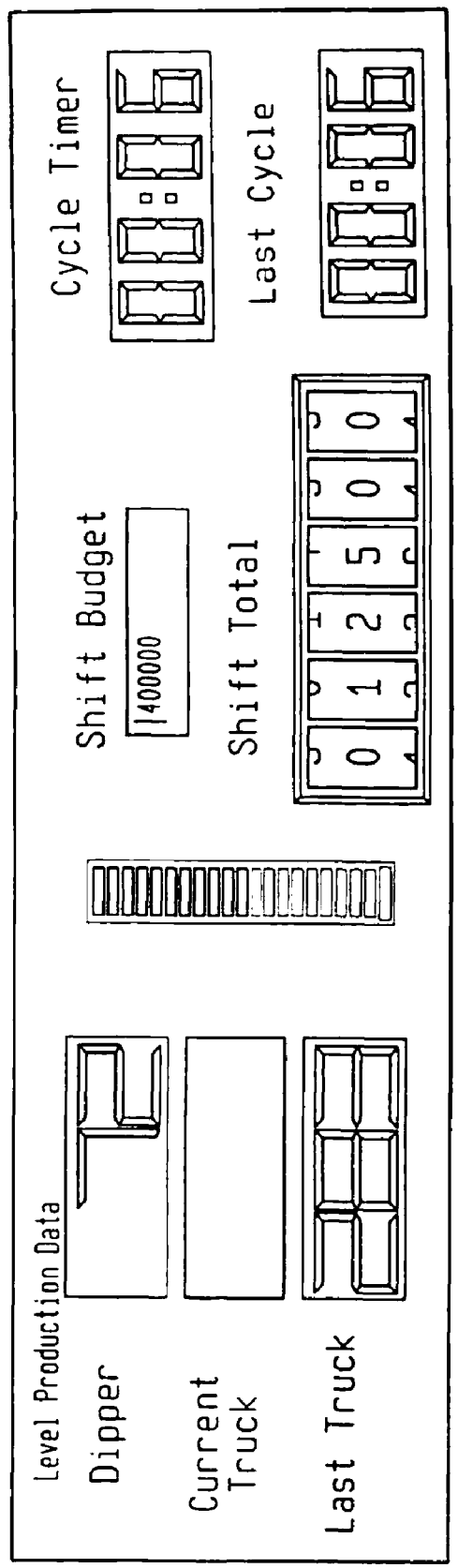
FIG. 23 is an exemplary user interface showing a graphical rendering of gauges displaying production data of a mining shovel.

FIG. 23 is an exemplary user interface showing a graphical rendering of gauges displaying production data of a mining shovel.

Figure 24:
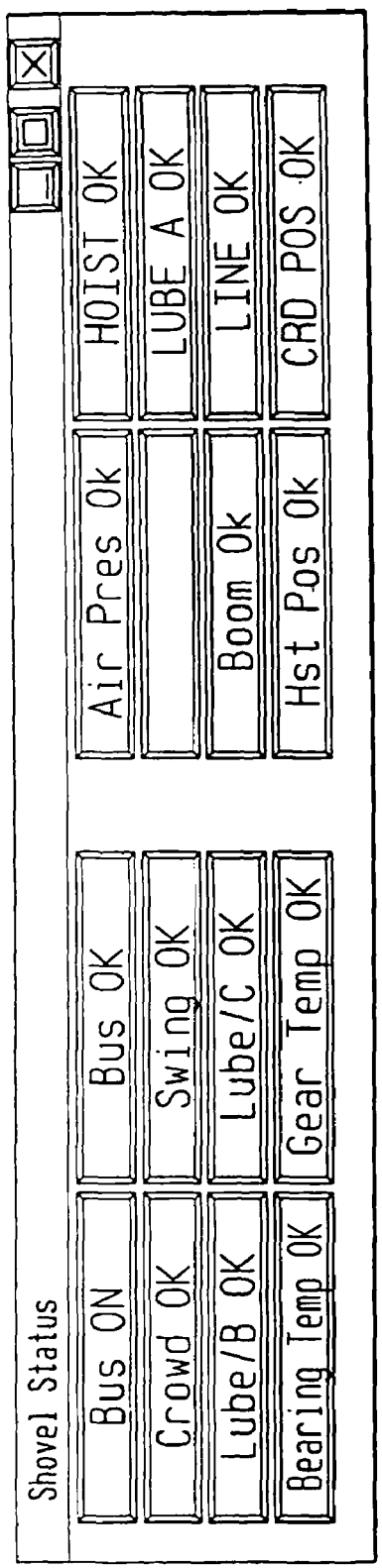
FIG. 24 is an exemplary user interface providing operating statuses of mining shovel components.

FIG. 24 is an exemplary user interface providing operating statuses of mining shovel components.

Figure 25:
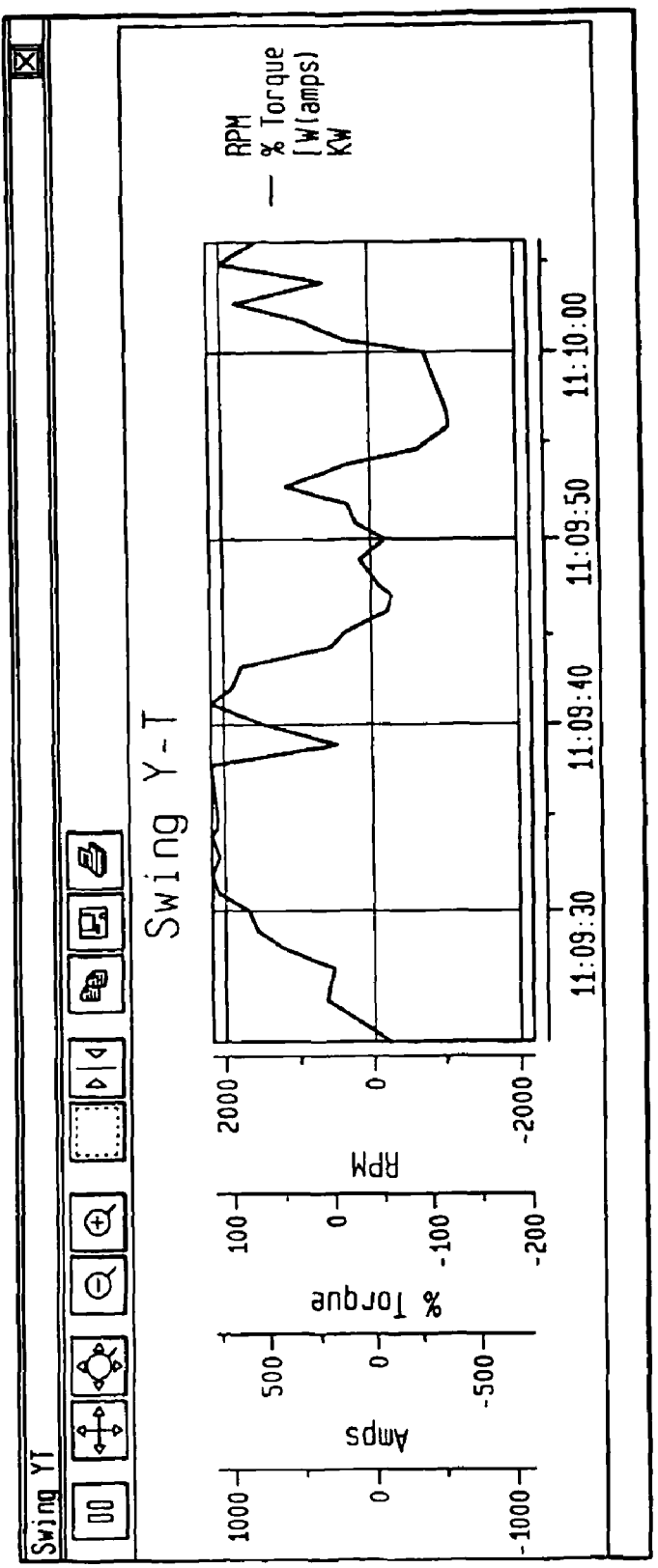
FIG. 25 is an exemplary user interface showing a graphical trend chart of electrical data for a swing motor of a mining shovel.

FIG. 25 is an exemplary user interface showing a graphical trend chart of electrical data for a swing motor of a mining shovel.

Figure 26:
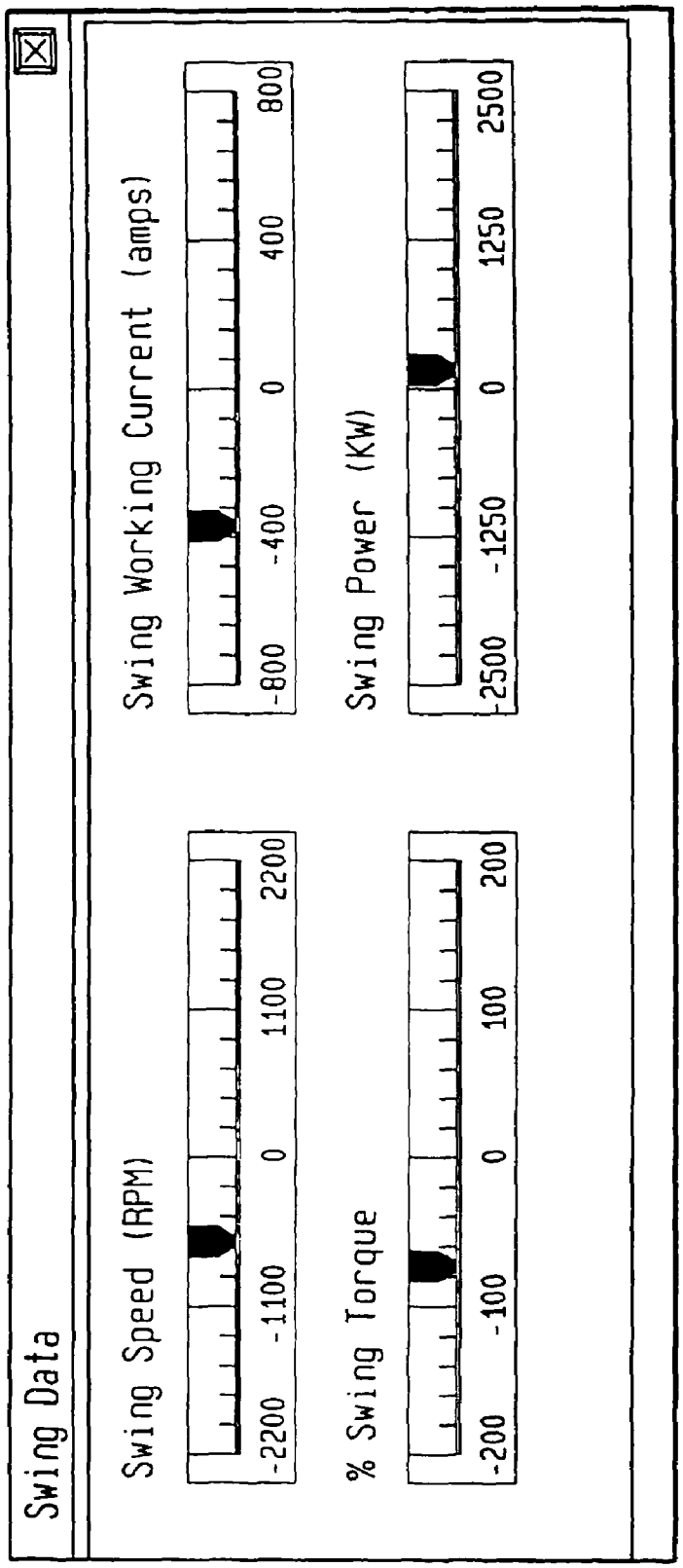
FIG. 26 is an exemplary user interface showing a graphical rendering of gauges displaying electrical data for a swing motor of a mining shovel.

FIG. 26 is an exemplary user interface showing a graphical rendering of gauges displaying electrical data for a swing motor of a mining shovel.

Figure 27:
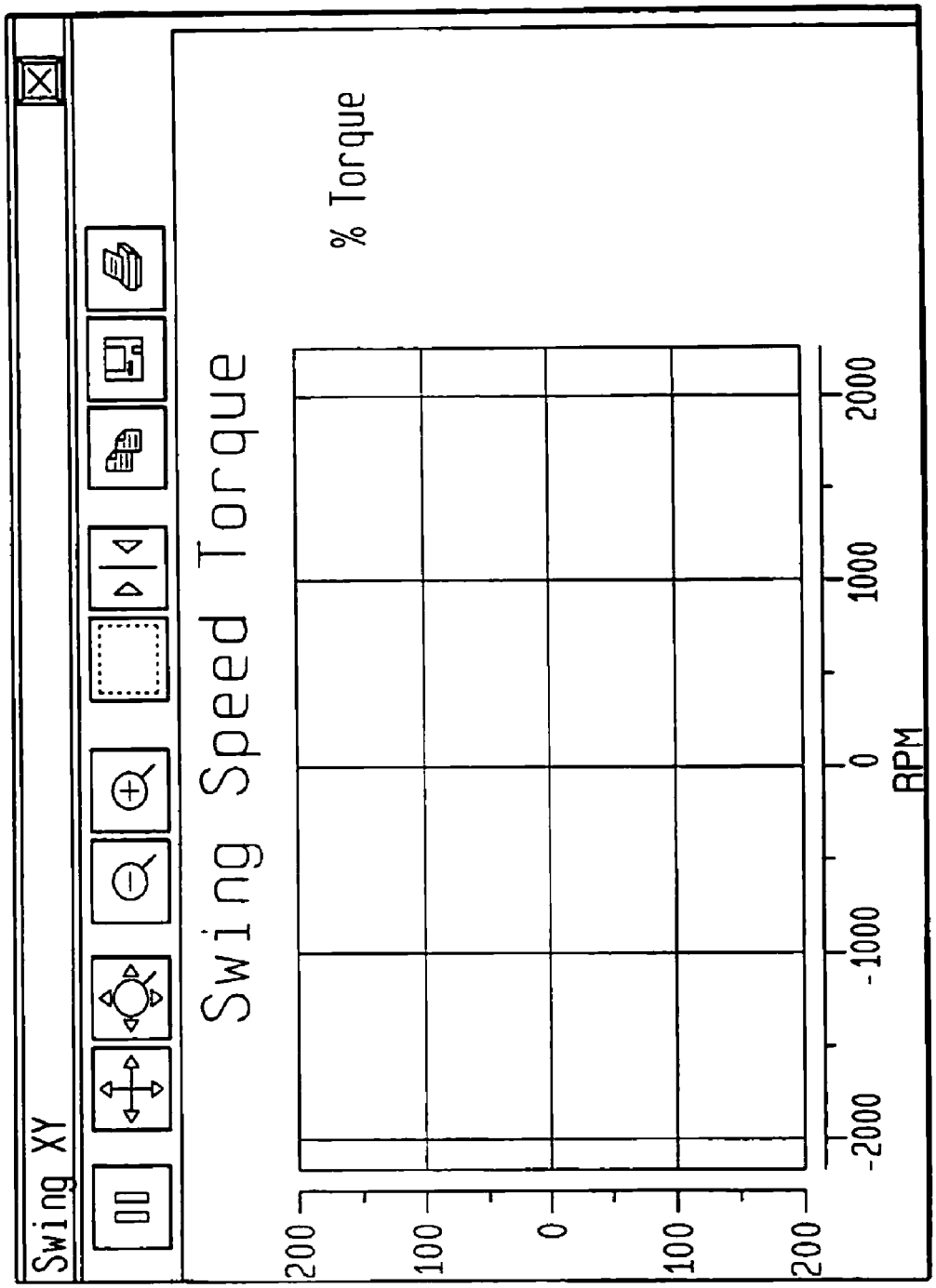
FIG. 27 is an exemplary user interface showing a relationship between speed and torque of a swing motor of a mining shovel.

FIG. 27 is an exemplary user interface showing a relationship between speed and torque of a swing motor of a mining shovel.

Figure 28:
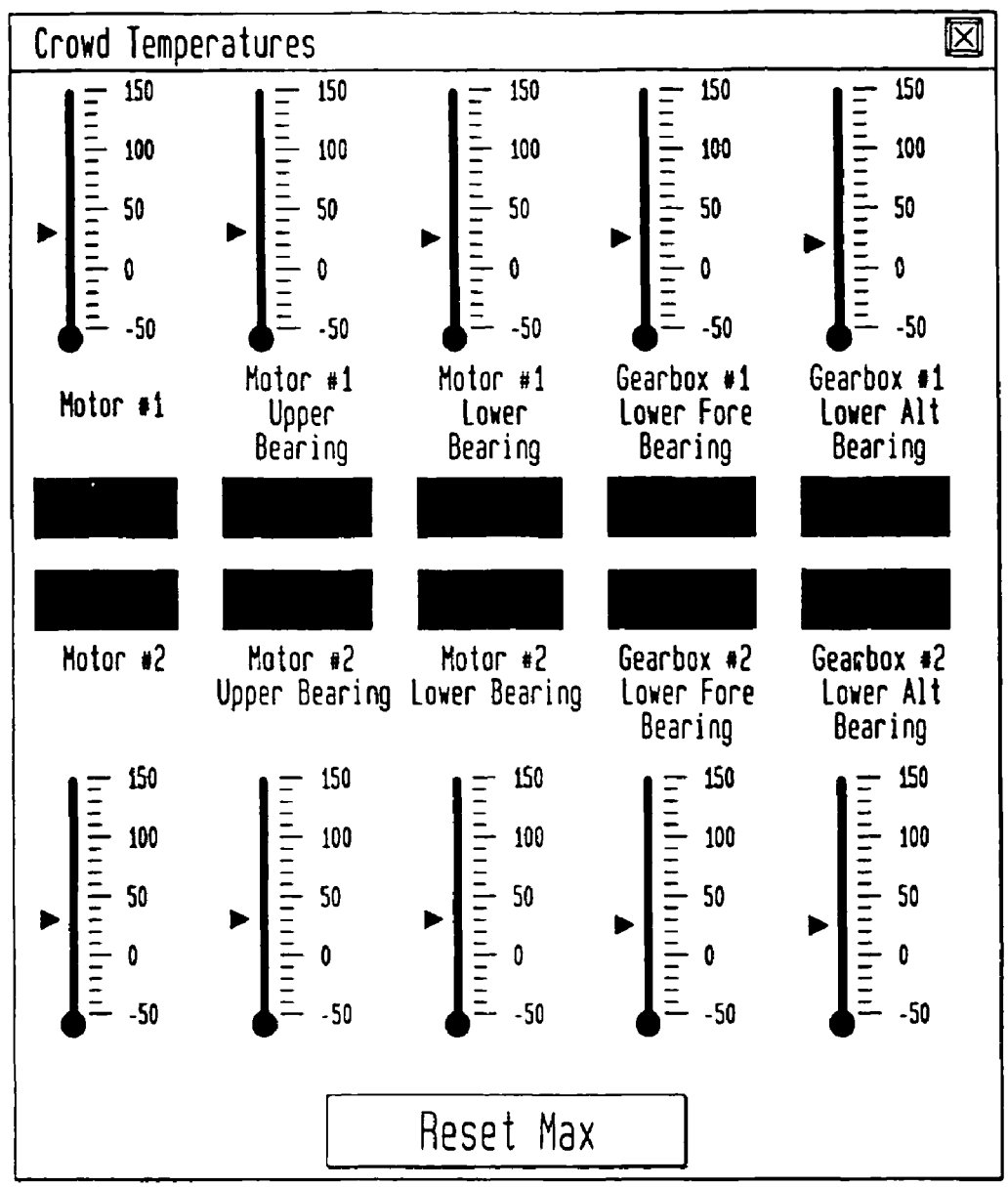
FIG. 28 is an exemplary user interface showing a graphical rendering of gauges displaying temperatures related to a mining shovel swing.

FIG. 28 is an exemplary user interface showing a graphical rendering of gauges displaying temperatures related to a mining shovel swing.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A method comprising:
   at an information device, rendering at least one report responsive to received operational data for components of an electric mining shovel, said operational data generated by a set of sensors associated with said electric mining shovel, said operational data wirelessly transmitted to said information device responsive to a non-zero transmission rate selected from a plurality of non-zero transmission rates by a user of said information device; and
   rendering at least a portion of said operational data via a user interface, wherein said user interface comprises a motion XY plot including a stream of process data displayed as a function of a non-time variable.

2. The method of claim 1, further comprising:
   at said information device, wirelessly receiving dispatch data, said dispatch data associated with a mine dispatch system and responsive to receipt of said operational data.

3. The method of claim 1, further comprising:
   at said information device, wirelessly receiving dispatch data, said dispatch data associated with a mine dispatch system and related to said operational data.

4. The method of claim 1, further comprising:
   at said information device, wirelessly receiving machinery scheduling information, said machinery scheduling information related to said operational data.

5. The method of claim 1, further comprising:
   querying said operational data using a Machine Search Language engine.

6. The method of claim 1, further comprising: rendering a report comprising electric mining shovel production data.

7. The method of claim 1, further comprising:
   rendering a report comprising at least one deviation from an expected condition, said deviation determined from said operational data.

8. The method of claim 1, further comprising: exporting said operational data from a memory device.

9. The method of claim 1, further comprising:
   via a user interface, rendering at least a portion of said operational data associated with a user-selected subset of sensors from said set of sensors.

10. The method of claim 1, further comprising:
    via a user interface, rendering at least a portion of said operational data in approximately real-time with respect to transmission of said at least a portion of said operational data from said electric mining shovel.

11. The method of claim 1, further comprising:
    via a user interface, rendering at least a portion of said operational data, wherein said rendering automatically updates said user interface.

12. The method of claim 1, further comprising:
    via a user interface, rendering at least a portion of said operational data, wherein the wirelessly receiving user selects a time period over which said at least a portion of said operational data pertains.

13. The method of claim 1, further comprising:
    via a user interface, rendering a portion of said operational data, wherein said user interface comprises a schematic model of said electric shovel.

14. The method of claim 1, further comprising:

via a user interface, rendering at least a portion of said operational data, wherein said user interface comprises a schematic model of said electric shovel, said schematic model reflecting a position of an electric mining shovel component.

15. The method of claim 1, further comprising:
via a user interface, rendering at least a portion of said operational data, wherein said user interface comprises a motion gauge.

16. The method of claim 1, further comprising:
via a user interface, rendering at least a portion of said operational data, wherein said user interlace comprises information indicative of performance of a dispatcher.

17. The method of claim 1, further comprising:
via a user interface, rendering at least a portion of said operational data, wherein said user interface comprises at least one reset for a minimum acceptable value related to at least one of said set of sensors.

18. The method of claim 1, further comprising:
via a user interface, rendering at least a portion of said operational data, wherein said user interface comprises at least one reset for a maximum acceptable value related to at least one of said set of sensors.

19. The method of claim 1, further comprising:
via a user interface, rendering at least a portion of said operational data, wherein said user interface comprises a pan command.

20. The method of claim 1, further comprising:
via a user interface, rendering at least a portion of said operational data, wherein said user interface comprises a zoom command.

21. The method of claim 1, further comprising:
via a user interface, rendering at least a portion of said operational data, wherein said user interface comprises a rendering analogous to a panel viewable by an operator of said electric mining shovel.

22. The method of claim 1, further comprising:
rendering a user interface comprising at least one Active X control associated with at least a portion of said operational data.

23. The method of claim 1, wherein:
said operational data is stored in a database searchable by a Machine Search Language engine.

24. A non-transitory computer readable medium comprising computer instructions stored therein for causing a computer processor to perform activities comprising:
at an information device, rendering at least one report responsive to received operational data for components of an electric mining shovel, said operational data generated by a set of sensors associated with said electric mining shovel, said operational data wirelessly transmitted to said information device responsive to a non-zero transmission rate selected from a plurality of non-zero transmission rates by a user of said information device; and
rendering at least a portion of said operational data via a user interface, wherein said user interface comprises a motion XY plot including a stream of process data displayed as a function of a non-time variable.

25. A method comprising:
at an information device, rendering at least one report responsive to wirelessly received operational data for components of an electric mining shovel, said operational data generated by a set of sensors associated with said electric mining shovel, said operational data sampled responsive to a non-zero sampling rate selected from a plurality of non-zero sampling rates by a user of said information device; and
rendering at least a portion of said operational data via a user interface, wherein said user interface comprises a motion XY plot including a stream of process data displayed as a function of a non-time variable.

26. A non-transitory computer readable medium comprising computer instructions stored therein for causing a computer processor to perform activities comprising:
at an information device, rendering at least one report responsive to wirelessly received operational data for components of an electric mining shovel, said operational data generated by a set of sensors associated with said electric mining shovel, said operational data sampled responsive to a non-zero sampling rate selected from a plurality of non-zero sampling rates by a user of said information device; and
rendering at least a portion of said operational data via a user interface, wherein said user interface comprises a motion XY plot including a stream of process data displayed as a function of a non-time variable.

27. A system for remotely analyzing performance of an electric mining shovel, the system comprising:
an input processor adapted to receive operational data from a memory device, said operational data generated by a set of sensors associated with components of an electric mining shovel, said operational data transmitted responsive to a non-zero transmission rate selected from a plurality of non-zero transmission rates by a wirelessly receiving user;
a user interface adapted to render at least a portion of said operational data, wherein said user interface comprises a motion strip chart; and
a report processor adapted to render at least one report responsive to said operational data.

* * * * *